(12) United States Patent
Ichihashi

(10) Patent No.: US 10,444,532 B2
(45) Date of Patent: *Oct. 15, 2019

(54) LENS DRIVING DEVICE

(71) Applicant: TDK CORPORATION, Minato-ku, Tokyo (JP)

(72) Inventor: Shusuke Ichihashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,589

(22) Filed: Apr. 27, 2018

(65) Prior Publication Data
US 2018/0246343 A1  Aug. 30, 2018

Related U.S. Application Data

(62) Division of application No. 15/136,542, filed on Apr. 22, 2016, now Pat. No. 9,989,779.

(30) Foreign Application Priority Data

Apr. 23, 2015 (JP) .................................. 2015-088274
May 8, 2015 (JP) .................................. 2015-096080

(51) Int. Cl.
  *G02B 27/64* (2006.01)
  *G02B 7/04* (2006.01)
  (Continued)

(52) U.S. Cl.
  CPC ............. *G02B 27/646* (2013.01); *G02B 7/04* (2013.01); *G02B 7/08* (2013.01); *G02B 7/102* (2013.01);
  (Continued)

(58) Field of Classification Search
  CPC ........................................................ G03B 3/10
  (Continued)

(56) References Cited

U.S. PATENT DOCUMENTS

2008/0055421 A1    3/2008  Kimura
2009/0060485 A1*   3/2009  Takahashi ............ G02B 27/646
                                                              396/55
(Continued)

FOREIGN PATENT DOCUMENTS

JP    2008-058445 A   3/2008
JP    2009-217051 A   3/2008
(Continued)

*Primary Examiner* — Clayton E. LaBalle
*Assistant Examiner* — Kevin C Butler
(74) *Attorney, Agent, or Firm* — Arent Fox LLP

(57) ABSTRACT

The present invention is a lens driving device comprising first driving coils 30a which relatively moves a lens holder 40 against a base part 10 along X axis perpendicular to an optical axis of a lens 100, and second driving coils 30b which relatively moves a lens holder 40 against a base part 10 along Y axis perpendicular to an optical axis. At the base part 10, an opening part 12 is formed where a part of the lens 100 is to be inserted in a movable manner along the driving plane. The oblique diameter Dxy1 and Dxy2 of the opening part 12 along the oblique direction positioned at the middle of X axis and Y axis, is larger than the first inner diameter Dx along X axis direction of the opening part 12, and also larger than the second inner diameter Dy along Y axis direction of the opening part 12. At the base part 10, the cylinder shape projection part 14 is formed along the periphery of the opening part 12.

17 Claims, 18 Drawing Sheets

(51) Int. Cl.
   *G02B 7/08*    (2006.01)
   *H04N 5/232*   (2006.01)
   *G02B 7/36*    (2006.01)
   *G03B 3/10*    (2006.01)
   *G02B 7/10*    (2006.01)

(52) U.S. Cl.
   CPC .................. *G02B 7/36* (2013.01); *G03B 3/10* (2013.01); *H04N 5/23212* (2013.01)

(58) Field of Classification Search
   USPC ........................................................ 396/133
   See application file for complete search history.

(56) References Cited

U.S. PATENT DOCUMENTS

| | | | |
|---|---|---|---|
| 2012/0013753 A1 | 1/2012 | Kanda | |
| 2012/0314307 A1* | 12/2012 | Ikushima | G02B 27/646 359/814 |
| 2012/0314308 A1* | 12/2012 | Ikushima | G02B 7/08 359/814 |
| 2017/0082829 A1 | 3/2017 | Kudo et al. | |

FOREIGN PATENT DOCUMENTS

| | | | |
|---|---|---|---|
| JP | 2009-053554 A | 3/2009 | |
| JP | 2011-065140 A | 3/2011 | |
| JP | 2012-022183 A | 2/2012 | |
| JP | 2012-215605 A | 11/2012 | |
| JP | WO 2015/045527 A1 | 11/2012 | |
| JP | 2015-232682 A | 12/2015 | |

* cited by examiner

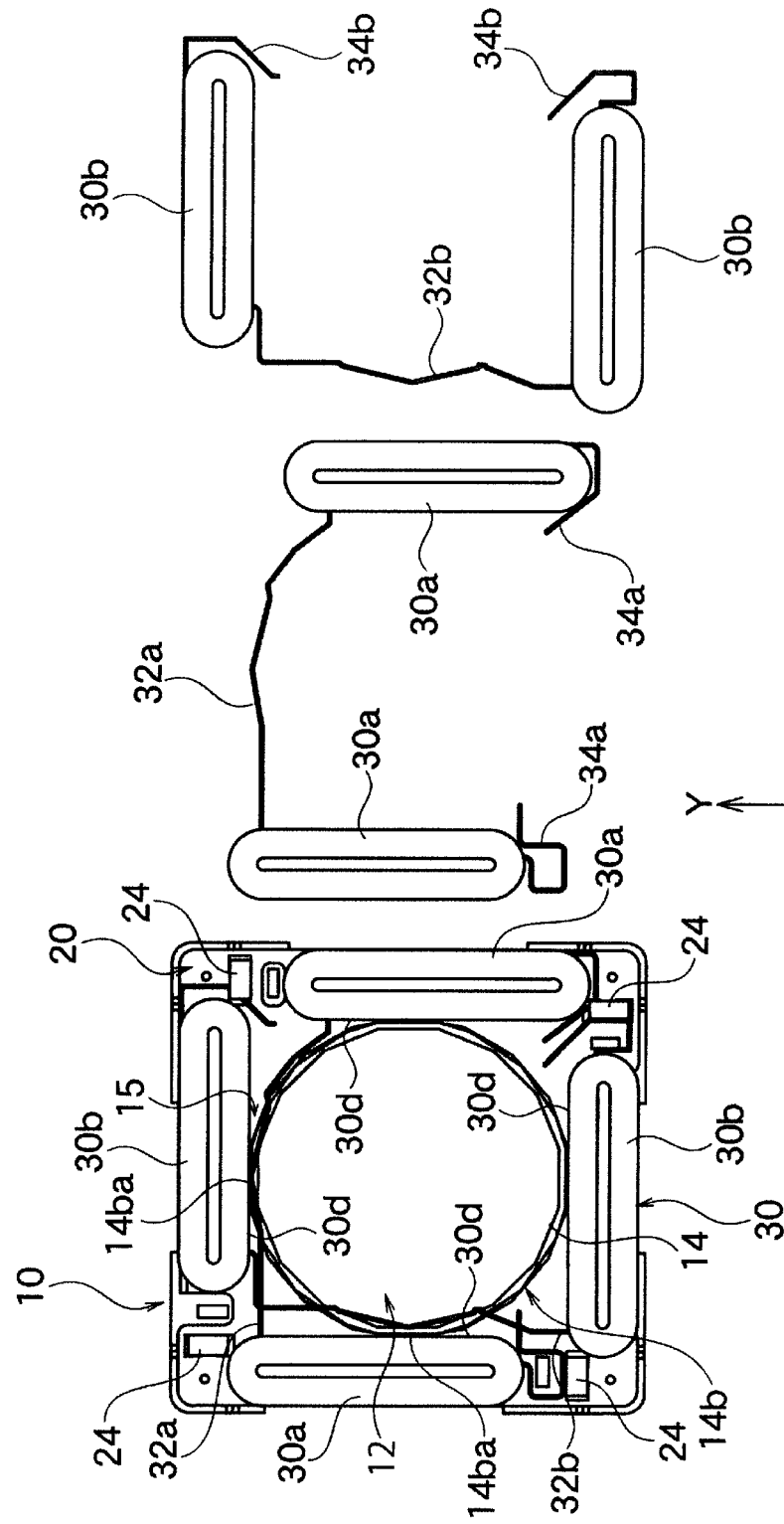

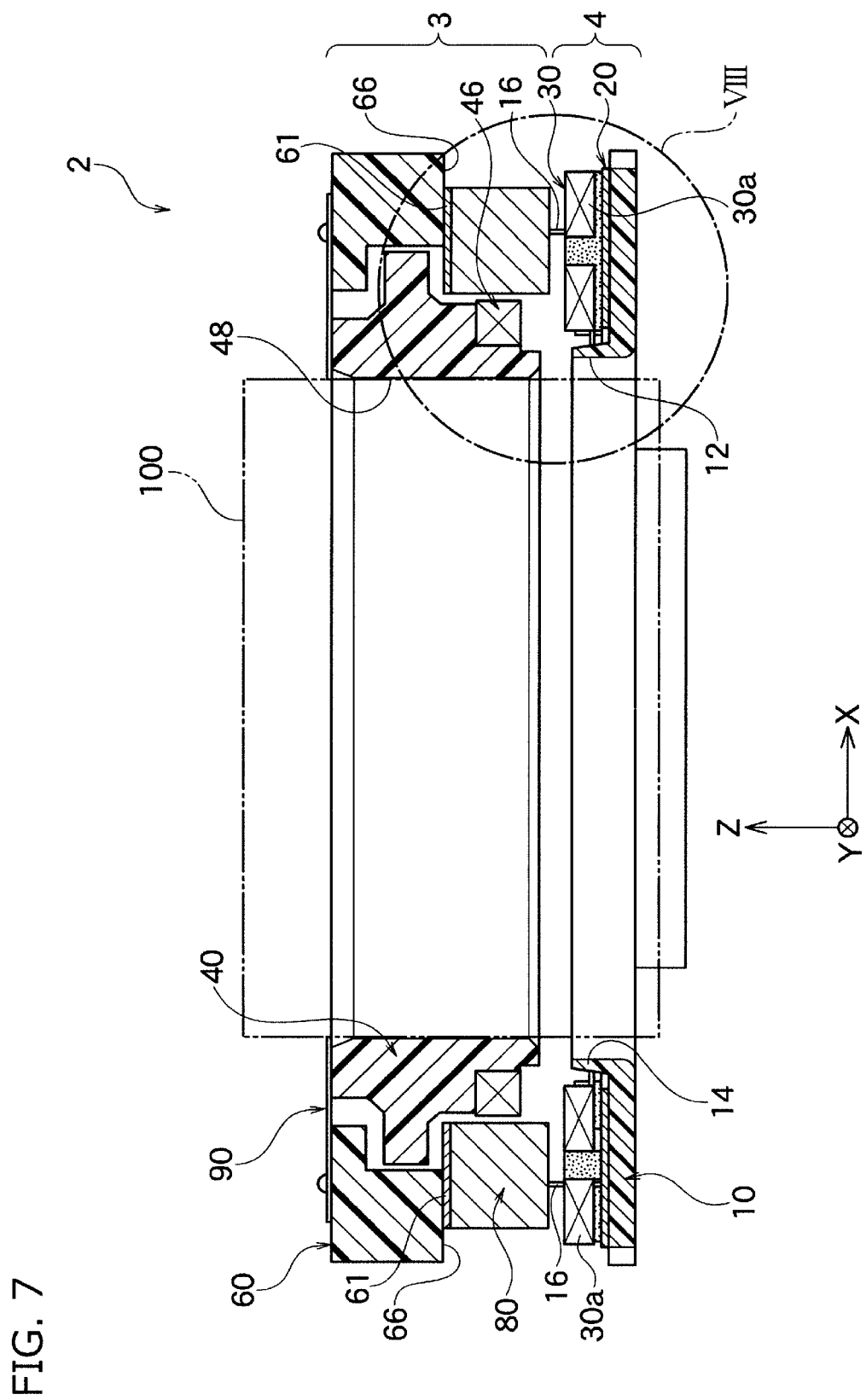

LENS DRIVING DEVICE

CROSS-REFERENCE TO RELATED APPLICATIONS

This application is a Divisional of U.S. Patent Application No 15/136,542, filed on Apr. 22, 2016, which is based upon and claims the priority of the prior Japanese Patent Application No. 2015-088274, filed Apr. 23, 2015, and prior Japanese Patent Application No. 2015-096080, filed May 8, 2015, each of which is incorporated herein by reference in its entirety.

BACKGROUND OF THE INVENTION

1. Field of the Invention

The present invention relates to a lens driving device suitably used for instance as a camera module of a mobile phone or so.

2. Description of the Related Art

In the lens driving device suitably used for instance as the camera module of the mobile phone or so, the device has been developed which carries out the blur correction by moving the blur correction movable part including a lens holder holding the lens in the perpendicular direction along the optical axis (for example refer to following patent document 1). In order to carry out the blur correction by moving the blur correction movable part in the perpendicular direction along the optical axis, a part of a first driving part having a first driving axis, and a part of a second driving part having a second driving axis are provided to a base part.

At the base part, an opening part is formed where at least part of the lens held by the lens holder is inserted. For the conventional devices, the opening part of the base part is formed in a circular shape to match with an outer shape of the lens. Also, in order to move the lens with respect the base part in the perpendicular direction against the optical axis, the inner diameter of the opening part is made larger than the outer diameter of the lens inserted to the opening part.

The size of the base part is preferably as small as possible in order to achieve a compact device. Therefore, if the inner diameter of the opening part which is formed at the base part is too large, the distance between the outer sides of the base part and the opening part is shortened, thereby the space to place the driving part on the base part will be lost. Thus, the inner diameter of the opening part is made to have minimum size necessary in accordance with the outer diameter of the lens.

Thus, it has been thought to design the inner diameter of the opening part of the base part so to secure the maximum moving amount along first driving axis direction of the lens, or to secure the maximum moving amount along the second driving axis direction of the lens. By designing as such, in case the lens moves only to the first driving axis direction or moves only to the second driving axis direction, there is no risk of lens colliding to the periphery of the opening part.

However, the lens does not necessarily move only along the first driving axis direction or only along the second driving axis direction, but for example, it also moves along the oblique direction positioned in middle of the first driving axis and the second driving axis. In the oblique direction, the lens moves along the moving vector corresponding to the sum of the moving vector along the first driving axis and the moving vector along the second driving axis.

Therefore, the moving amount of the lens in the oblique direction is longer by $\sqrt{2}$ times or so (about 1.44 times) at maximum compared to the moving amount along the first driving axis and the second driving axis; and in the worst case scenario, the lens might collide to the periphery of the opening part of the base part. When the lens collides against the periphery of the opening part of the base part, the lens might be damaged and also there may be a problem such as declined quality of blur correction or so due to the impact of the collision.

In order to avoid such problems, the opening part of the inner diameter which is unnecessarily larger compared to the diameter of the lens is formed at the base part. Therefore, it is difficult to make the size of the base part compact; hence as a result, it was unable to make the device compact.

[Patent document 1] JP Patent Application Laid Open No. 2011-65140

SUMMARY OF THE INVENTION

The present invention has been achieved in view of such situation, and the first object is to provide the lens driving device capable of making the device compact, and also to reduce the risk of the lens colliding against the periphery of the opening part of the base part. The second object of the present invention is to provide the lens driving device capable of preventing the particles from flowing into the opening part of the base.

In order to achieve said first object, the lens driving device according to the first aspect of the present invention comprises, a first driving part allowing a lens part including at least one lens to relatively move against a base part along a first driving axis crossing with an optical axis of said lens, a second driving part allowing said lens part to relatively move against said base along a second driving axis crossing with said optical axis of the lens and with said first driving axis, wherein an opening part is formed at said base part to which a part of said lens is inserted in a movable manner along a driving plane including said first driving axis and said second driving axis, and an oblique internal diameter of said opening part along an oblique direction positioned in the middle of said first driving axis and said second driving axis is larger than a first internal diameter of said opening part along a direction of said first driving axis, and also larger than a second internal diameter of said opening part along a direction of said second driving axis.

The lens driving device according to the first aspect of the present invention has the oblique inner diameter of the opening part along the oblique direction positioned between the first driving axis and the second driving axis larger than the first inner diameter along the first driving axis direction of the opening part; and also larger than the second inner diameter along the second driving axis direction of the opening part. By taking such constitution, not only in case the lens moves along the first driving axis direction or the second driving axis direction, but also in case the lens moves along the oblique direction in the middle thereof, the risk of the lens colliding to the periphery of the opening part can be removed.

Furthermore, as for the lens driving device according to the first aspect of the present invention, the opening part formed at the base part does not form a perfect circle, but has an atypical shape wherein the inner diameter along the oblique direction positioned in the middle of the first driving axis direction and the second driving axis direction is larger than the inner diameter along the first driving axis direction or the second driving axis direction. Therefore, compared to the opening part of perfect circle which was determined based on the maximum moving amount along the oblique direction, the size of the base part can be made small, and this contributes to achieve the compact device.

Alternatively, if the size of the base part is the same as the size of the conventional base part, compared to the opening part of perfect circle which was determined based on the maximum moving amount along the oblique direction, in the present invention, the width of the base part along the first driving axis and the second driving axis can be made larger. Therefore, the number of windings of the coil which constitutes a part of the first driving part and the second driving part can be increased, hence the driving force is enhanced, and the accuracy of the blur correction is improved.

Preferably, said first driving part includes a pair of first driving coils positioned at both sides along said first driving axis direction while placing said opening part therebetween, and a pair of said first driving coils are placed parallel along opposing two sides of said base part.

By taking such constitution, the driving force along the first driving direction is enhanced, and the accuracy of the blur correction is improved.

Preferably, said second driving part includes a pair of second driving coils positioned at both sides along said second driving axis while placing said opening part therebetween, and a pair of said second driving coils are placed parallel along opposing two sides of said base part.

By taking such constitution, the driving force along the second driving direction is enhanced, and the accuracy of the blur correction is improved.

Preferably, said lens part is held at a flame in a movable manner in the optical axis direction, and said flame is held in a movable manner along said driving plane against said base part using plurality of suspension wires.

By taking such constitution, the lens part can move freely along the driving plane against the base part.

Preferably, said flame has a square ring shape as a whole and placed inside a case of square cylinder shape fixed to said base, and said oblique direction roughly matches to a diagonal line direction of said square ring shape.

By taking such constitution, it enables to efficiently place a part of first driving part and a part of the second driving part on the base part, thus the size of the base part can be made smaller and the device can be made compact easily.

Preferably, a cylinder shape projection part is formed at said base part along a periphery of the opening part, and at least part of said first driving part and said second driving part are placed around said cylinder shape projection part.

By taking such constitution, it can effectively prevent the lens from colliding against at least a part of the first driving part and the second driving part (the driving coil) placed around the cylinder shape projection part. Also, by having the cylinder shape projection part, the dust present at the surface of the base part becomes difficult to enter inside the opening part. At the inside of the opening part, the lens is inserted, and at the positioned spaced apart along the optical axis direction of the lens, the image sensor or so is placed. When the dust or so attaches to the image sensor element, the quality of the images to be taken may decline, thus preferably the dust does not enter inside the opening part.

In order to achieve the above mentioned second object, the lens driving device according to the second aspect of the present invention comprises a movable part having a lens holder holding a lens and a driving magnet for driving said lens in optical axis perpendicular direction, a fixing part having a driving coil placed to face against said driving magnet to drive said lens in said optical axis perpendicular direction, and a base part formed with a base opening part to allow an incident light on said lens to pass through and the base part is also provided with said driving coil, and a supporting part connecting said movable part to said fixing part in relative movable manner, and supporting said movable part to said fixing part, wherein a cylinder projection part which projects out along the optical axis direction of said lens towards said movable part is formed along a periphery of said base opening part at said base part, a projection end of said cylinder shape projection part is positioned at front side along the optical axis direction of said lens than a coil mounting plane where said driving coil is mounted in said base part, and a coil front end of said driving coil is positioned at front side along said optical axis direction than said projection end.

In the lens driving device according to the second aspect of the present invention, the cylinder projection part is formed along the periphery of the base opening part; hence in case the particles are generated in the lens driving device, the particles can be stopped by the cylinder projection part. Therefore, the particles can be prevented from flowing in from the base opening part to the image sensor side which is at the rear side (the opposite of the front side along the optical axis). Note that, the front side along the optical axis refers to the side closer to the movable part along the optical axis, and matches with the entering side when the light passes through (the image object side); and the rear side refers to the side away from the movable part along the optical axis, and matches with the exiting side of light.

Further, the projection end of the cylinder shape projection part is positioned at the front side than the coil mounting plane, and it is also positioned at rear side than the coil front end of the driving coil. Therefore, even in case the movable part and the fixing part contacts against each other due to the impact or so from the outside, since the coil is placed closer to the movable part than the cylinder shape projection part, the cylinder shape projection part can be prevented from directly contacting with the movable part. Therefore, even if the movable part and the fixing part collides against each other, the particles generated by the collision can be prevented from flowing into the image sensor side via the base opening part, since the position of the collision will be further towards the outer circumference side than the cylinder shape projection part.

Also, for example, a predetermined space may be formed between an outer peripheral side plane of said cylinder shape projection part and said driving coil.

Even in case the particles at the front plane of the driving coil moves towards the base opening part, these particles will be trapped in such space, hence the particles can be effectively prevented from flowing into the image sensor side via the base opening part.

Also, for example, a wire connecting to said driving coil may be placed in said space.

By placing the wire connecting to the driving coil at the space, the wire distance of the driving coil can be shortened, and also the space for placing other members in the base part can be made wider.

Also, for example, said outer peripheral side plane of said cylinder projection part may comprise a projection part flat plane part extending parallel to a flat plane including said optical axis, and said projection part flat plane part may face against, by placing the space in between, a coil flat plane part which is part of the outer circumference side plane of said driving coil and extending parallel to the flat plane including said optical axis.

By taking such constitution, the particles tend to be easily trapped in the space formed between the outer peripheral side plane of the cylinder shape projection part and the side plane of the driving coil. Also, in case of placing the wires in the space, the wires can be prevented from slipping out from the space.

BRIEF DESCRIPTION OF DRAWINGS

FIG. 5A is the top view of arranging the circuit substrate and the driving coil on the base part shown in FIG. 2, FIG. 5B is the top view of the first driving coil shown in FIG. 5A, and FIG. 5C is the top view of the second driving coil shown in FIG. 5A.

FIG. 7 is the cross section view along VII-VII line shown in FIG. 6B, and it is the cross section view wherein the flame and the lens holder are assembled on the upper part along Z axis direction of the partial assembly figure of FIG. 6B.

DESCRIPTION OF THE PREFERRED EMBODIMENTS

Hereinafter, the present invention will be described based on the embodiments shown in the figures.

First Embodiment

Figure 1A:
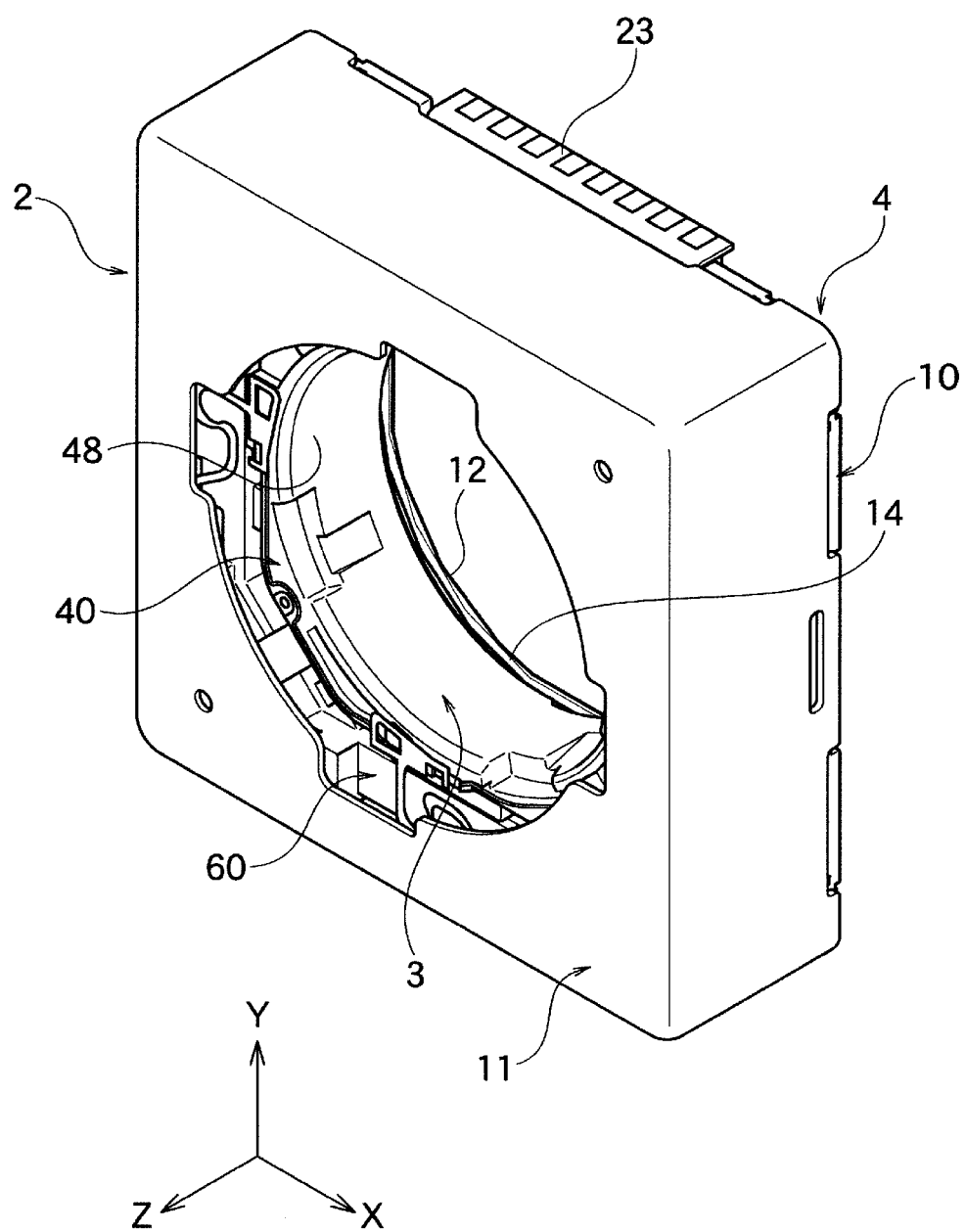
FIG. 1A is the perspective view of the entire lens driving device according to one embodiment of the present invention.

As shown in FIG. 1A, the lens driving device 2 according to one embodiment of the present invention comprises the fixing part 4, and the movable part 3 capable of moving against the fixing part 4. The fixing part 4 comprises the case 11 which covers the movable part 3 from the front side (from Z axis positive direction side), and the base part 10 covering the movable part 3 from the rear side (from Z axis negative direction side). The movable part 3 is placed at the inside of the case 11, and comprises the lens holder 40 holding the lens, and the flame 60 holding the lens holder 40 in a movable manner in the optical axis direction. At the inner peripheral plane 48 of the lens holder 40, the lens is installed however this is not shown in FIG. 1A.

The lens driving device 2 is used together with, for example, with the image sensor which is not shown in the figures. The image sensor is placed at the rear side (Z axis negative direction side) of the lens holder 40, and the light emitted from the lens which is held by the lens driving device is photoelectrically converted, thereby the image is generated. The placing method of the image sensor is not particularly limited, and it may be directly fixed against the base part 10 of the lens driving device 2, or it may be connected to the lens driving device 2 via other members.

Figure 1B:
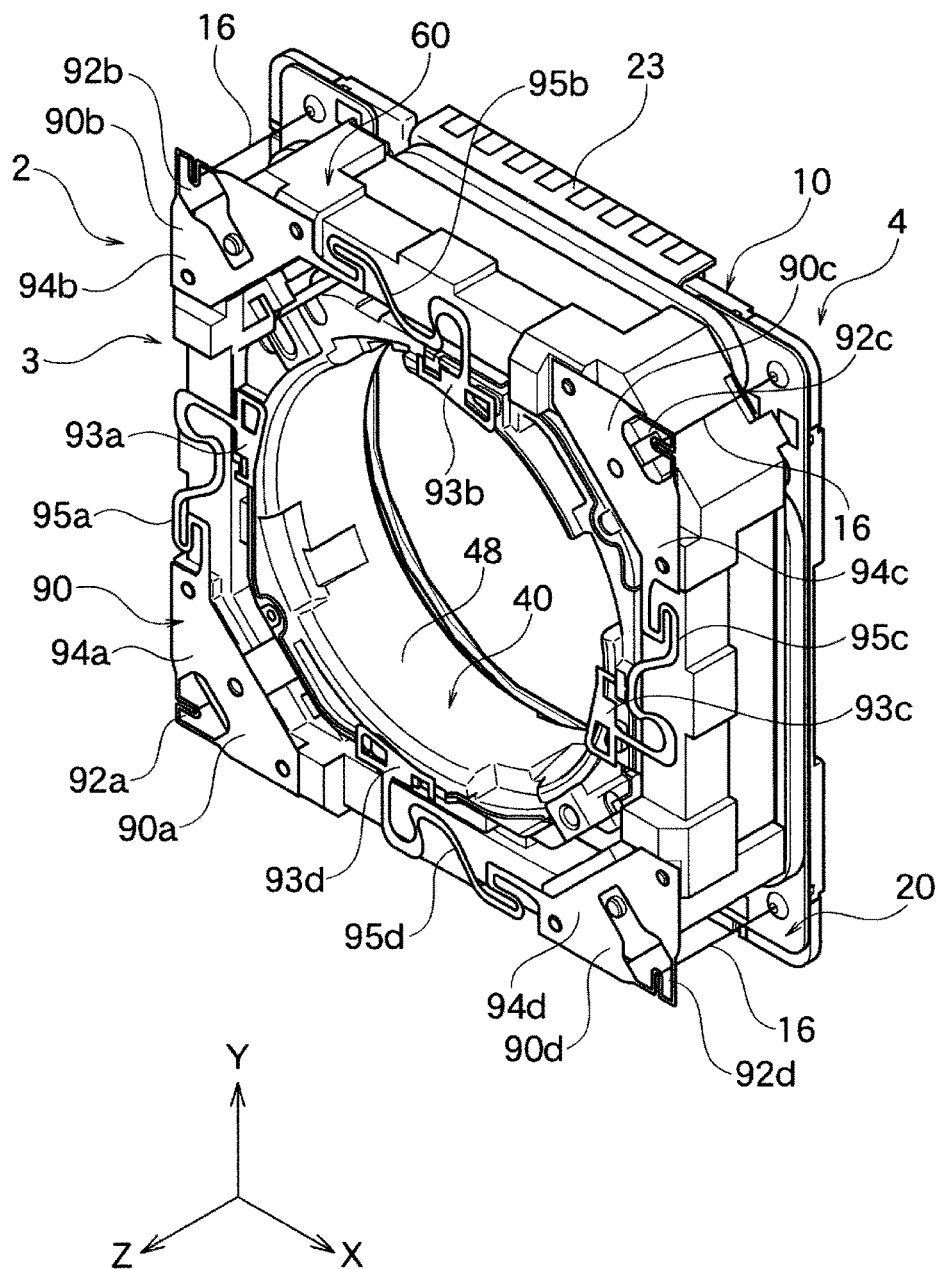
FIG. 1B is the perspective view showing the interior of entire lens driving device wherein the case shown in FIG. 1A is removed.
Figure 2:
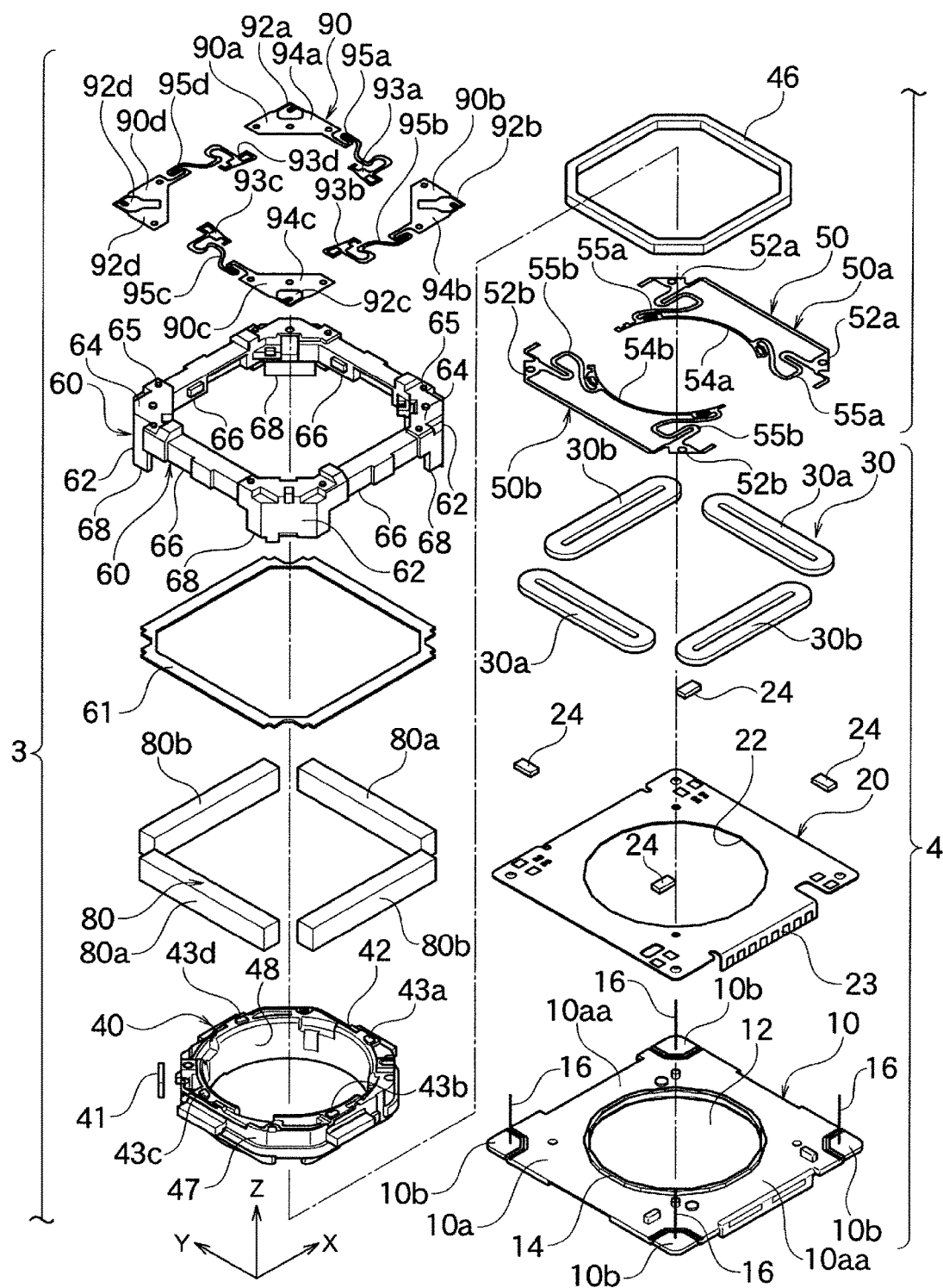
FIG. 2 is the exploded view of the lens driving device wherein the case shown in FIG. 1A is removed.

The base part 10 and the case 11 are joined at the rear part open end of the Z axis direction of the case 11. At the inside of the case 11, as shown in FIG. 1B and FIG. 2, the circuit substrate 20 constituted by FPC or so, the blur correction coil 30 as the driving coil, the lens holder 40, the magnet 80 as the driving magnet, and the flame 60 or so are placed towards the front side along the Z axis direction of the base part 10. The lens holder 40 and the flame 60 constitute the movable part against the fixing part 4.

The circuit substrate 20 and the blur correction coil 30 are a part of the fixing part 4; and the common magnet 80 and the flame 60 are part of the movable part 3. The movable part 3 includes the front side spring 90, the magnetic board 61, focusing coil 46 and the rear side spring 50 or so other than the lens holder 40, the magnet 80 and the flame 60.

At the center part of the circuit substrate 20, the substrate opening part 22 is formed which penetrates through the front and the back planes. To the substrate opening part 22, the cylinder shape projection part 14 formed at the center of the base board main body 10a of the base part 10 will be inserted. The cylinder shape projection part is formed along the periphery of the base opening part 12, and it projects out towards the front side which is the direction parallel to the optical direction and towards the movable part 3 from the fixing part 4. At the surface (the front plane) of the circuit substrate 20, the blur correction coil 30 is provided along the substrate opening part 22. Note that, the circuit substrate 20 is formed as one body with the base part 10.

As it will be described in below, the blur correction coil 30 comprises a pair of first driving coils 30a constituting the first driving axis, and a pair of the second driving coils 30b constituting the second driving axis which crosses roughly perpendicularly with the first driving axis. These driving coils 30a and 30b are fixed to the surface of the circuit substrate 20 by an adhesive agent or so.

The circuit substrate 20 included in the fixing part 4 has a rectangular shape as a whole, and the connector part 23 for connecting with the outer circuit is formed at one sides of the rectangular shape. The connector part 23 is placed at the side plane of the lens driving device 2 as shown in FIG. 1A. Note that, in all of the figures, the direction parallel to the optical axis of the lens 100 (see FIG. 7) fixed at the inner peripheral plane of the lens holder 40 is defined as Z axis, and the directions perpendicular to the optical axis are defined as X axis direction and Y axis direction.

Note that, X axis, Y axis and Z axis are perpendicular to each other. In the present embodiment, X axis matches the first driving axis, and Y axis matches the second driving axis. Also, the front plane or the front side along Z axis in FIG. 2 and FIG. 7 refers to upward direction, and refers to the image object side with respect to the lens. Also, the rear plane and the rear side along Z axis in FIG. 2 and FIG. 7 refers to the downward direction, and refers to the image sensor side with respect to the lens.

As shown in FIG. 2, the base part 10 comprises the base board main body 10a comprising the coil mounting plane 10aa, and the wire rear end installation corners 10b which is installed at each four corners of the base board main body 10a. At the front side of the coil mounting plane 10aa, the blur correction coil 30 is provided via the circuit substrate 20. For each wire rear end installation corners 10b, the rear end of the single suspension wire 16 is installed. The suspension wire 16 extends towards the front side of Z axis (the upward direction of FIG. 2) by penetrating through the four corners of the circuit substrate 20.

At the front plane 42 of the lens holder 40 shown in FIG. 2, the holder installation parts 93a to 93d of the front side spring 90 are installed and fixed. At a part of the outer circumference plane 47 of the lens holder 40 along the circumferential direction, the sensor part 41 is installed. The sensor part 41 is constituted by hall IC part or so which detects, for example, the relative movement of the hall element (hall magnet), and detects the relative position in Z axis direction of the lens holder 40 with respect to the flame 60. At the inner plane of the flame 60 corresponding to the sensor part 41, the hall magnet is provided which is omitted in the figures.

The front side spring 90 is constituted by four divisional plate springs 90a to 90d which are separated and insulated against each other. Each divisional plate springs 90a to 90d comprises wire installation parts 92a to 92d having corner shape to which the front end of the suspension wire 16 is installed. The suspension wire 16 and the divisional plate springs 90a to 90d are constituted by the conductive material such as metals, and these can be electrically connected.

The suspension wire 16 as the supporting part connects the front side spring 90 of the movable part 3, and the base part 10 of the fixing part 4. The suspension wire 16 can deflect resiliently along the driving plane which includes X axis and Y axis. Thereby, the suspension wire 16 connects the movable part 3 to the fixing part 4 in manner allowing a relative movement, and the movable part 3 is supported by the fixing part 4.

Figure 4A:
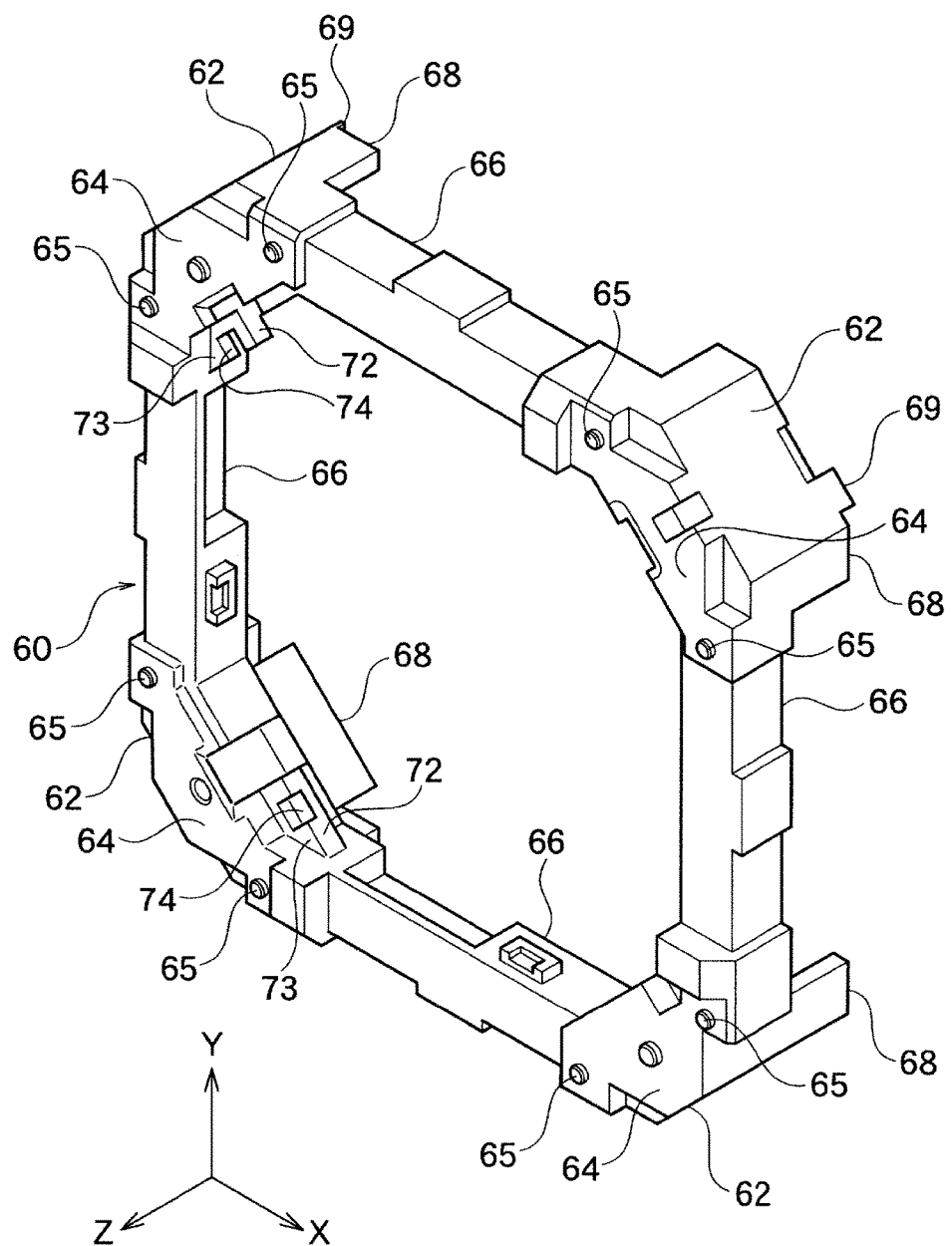
FIG. 4A is the perspective view of the flame shown in FIG. 2.

Note that, in case an excessive force is applied to the suspension wire 16, it is possible to deform resiliently along Z axis direction; however in the usual lens driving function, the suspension wire 16 freely deflect resiliently along the driving plane which includes X axis and Y axis. In order for the front end of the suspension wire 16 to be easily connected to each wire installation parts 92a to 92d of each divisional plate springs 90a to 90d, as shown in FIG. 4A, notch parts 62 are provided respectively to four corner parts of the flame 60.

Each divisional plate springs 90a to 90d comprises flame installation parts 94a to 94d respectively which are continuous with the respective wire installation parts 92a to 92b of the corner shape. Each flame installation parts 94a to 94d is for example installed and fixed at four corner parts positioned at the front plane 64 of the flame 60 having the square ring shape as shown in FIG. 4A. The flame 60 itself is constituted by the insulation material such as plastic or so.

At the front plane positioned at the corner part of the flame 60, preferably plurality of installation projection parts 65 are formed. Each installation projection parts 65 fits to the fitting hole formed at the flame installation parts 94a to 94d of the divisional plate springs 90a to 90d as shown in FIG. 1B and FIG. 2, and it is fixed by determining the position of the divisional plate springs 90a to 90d on the flame 60.

Figure 3A:
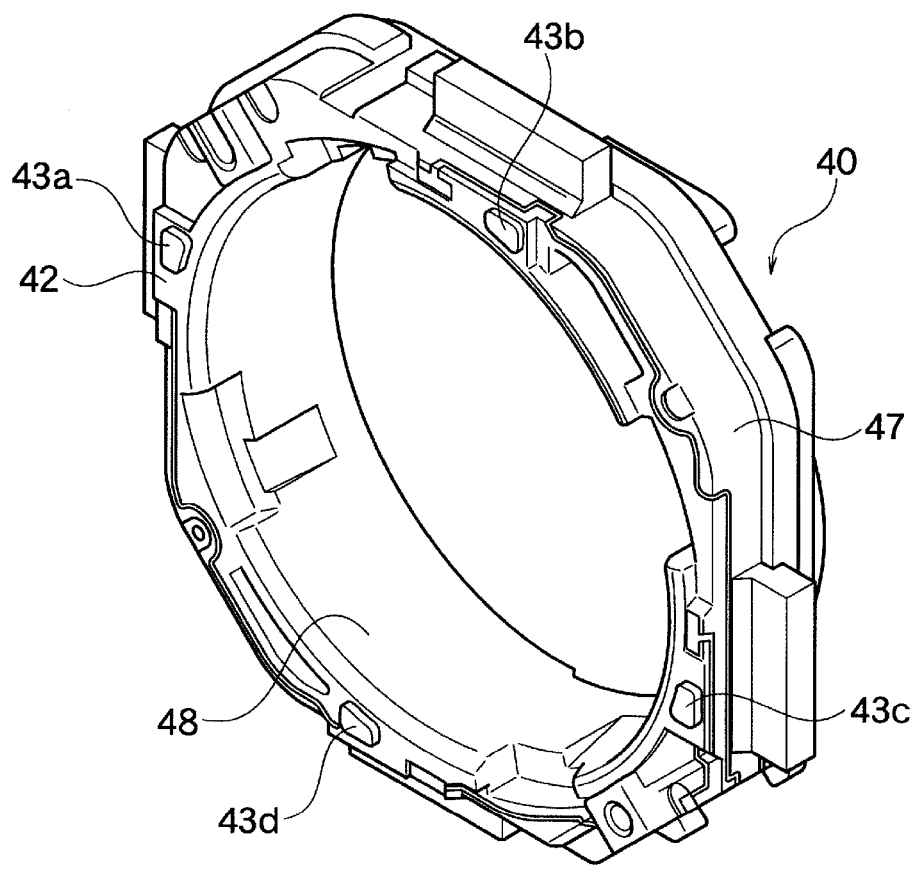
FIG. 3A is the perspective view of the lens holder shown in FIG. 2.

At flame installation parts 94a to 94d of each divisional plate springs 90a to 90d, the holder installation parts 93a to 93d are formed respectively via the meandering parts 95a to 95d. At the holder installation parts 93a to 93d, the fitting holes are respectively formed. The fitting holes fit to the installation projection parts 43a to 43d which are formed roughly equally along the circumferential direction of the front plane 42 of the lens holder 40 as shown in FIG. 3A. The divisional board springs 90a to 90d are fixed by adhesion or so to the front plane 42 of the lens holder 40 while the installation projection parts 43a to 43d of the lens holder 40 are inserted to the fitting hole.

That is, as the meandering parts 95a to 95d deforms resiliently, the front side spring 90 holds the lens holder 40 in a movable manner along Z axis direction which is the optical axis direction with respect to the flame 60, due to the holder installation parts 93a to 93d formed at the inner peripheral edge of the front side spring 90.

Further, each divisional plate springs 90a to 90d of the front side spring 90 are connected to different suspension wire 16 respectively, and also connects to the wire pattern formed on the front plane of the lens holder 40. Therefore, the driving current is supplied to the focusing coil 46 held by the lens holder via the suspension wire 16 and the front side spring 90, and also the detected signal by the sensor part 41 is transmitted to the circuit substrate 20. Each suspension wire 16 can be electrically connected to the wire pattern of the circuit substrate 20.

Figure 3B:
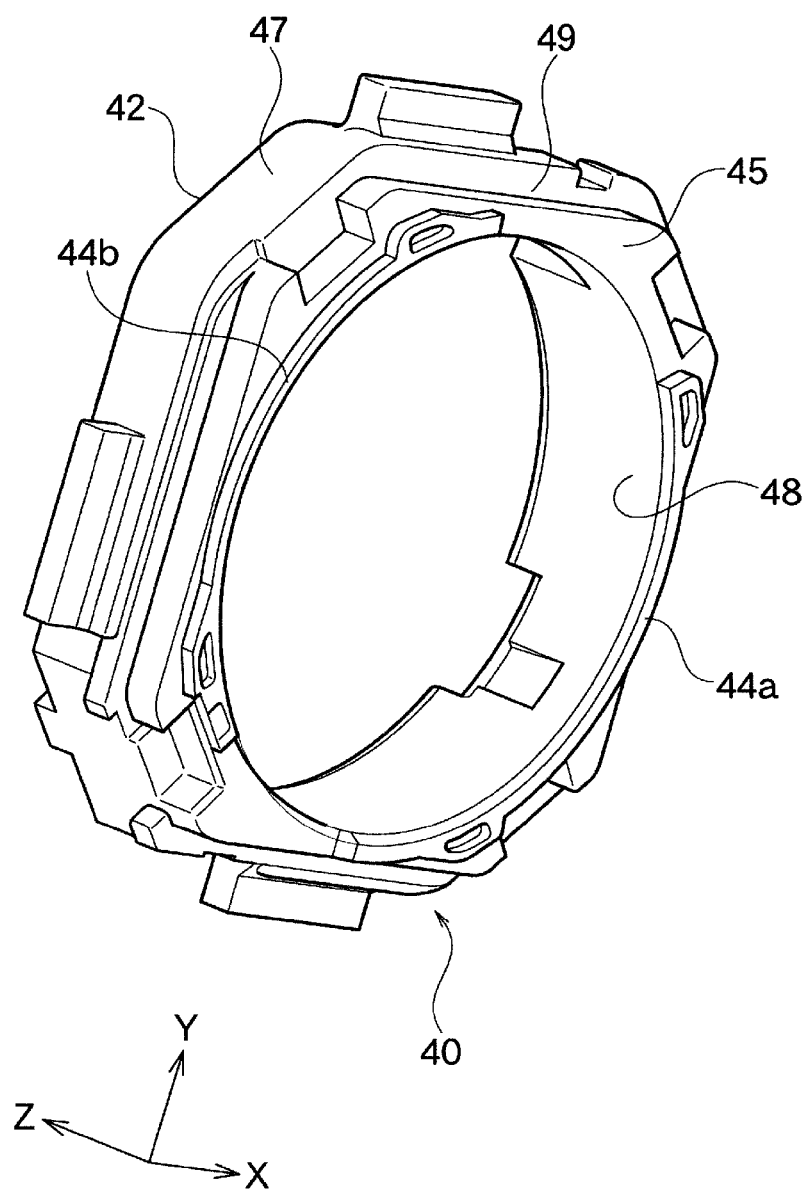
FIG. 3B is the perspective view of the lens holder shown in FIG. 3A looking from the different angle.

As shown in FIG. 3B, at the rear plane 45 of the lens holder 40, the plate spring installation parts 44a and 44b having the arc shape are formed. Also, at the back side of the outer circumference plane 47 of the lens holder 40, the step part 49 is formed. At the step part 49, the square ring shape focusing coil 46 shown in FIG. 2 is fixed.

As shown in FIG. 2, the rear side spring 50 is constituted by a pair of the divisional plate springs 50a and 50b. For each divisional plate springs 50a and 50b, the holder installation parts 54a and 54b having the arc shape are formed at each of the inner circumference parts thereof. Each holder installation parts 54a and 54b are fixed to the plate spring installation parts 44a and 44b as shown in FIG. 3B. As for the means of fixing the rear side spring 50 to the plate spring installation parts 44a and 44b, it is not particularly limited, and for example the fixing by fitting or by adhesive agent or so may be mentioned.

As shown in FIG. 2, the meandering parts 55a to 55b are formed continuously with the both end parts of the holder installation parts 54a and 54b; and at the outer circumference side of the meandering parts 55a and 55b, the flame installation parts 52a and 52b are formed continuously. Each flame installation parts 52a and 52b are fixed to the corner part rear plane 68 of the flame 60 by fitting.

That is, similar to the front side spring 90, because the meandering parts 55a to 55d deforms resiliently, in the rear side spring 50, the lens holder 40 is held, in a movable manner along Z axis direction which is the optical axis direction with respect to the flame 60, by the holder installation parts 54a to 54d formed at the inner circumference end. Note that, the rear side spring 50 does not necessarily need the electrical conductive path way function, which is different from the front side spring 90.

Figure 4B:
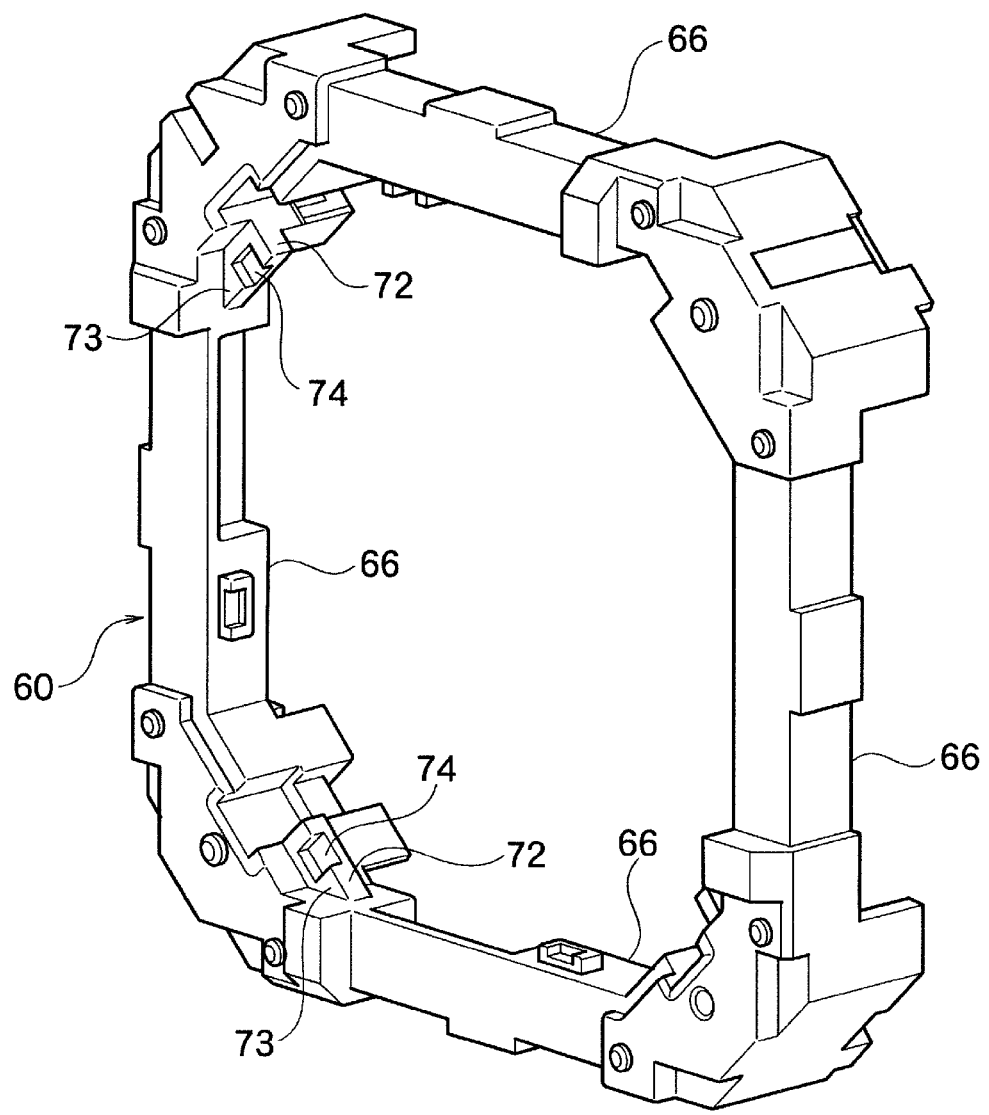
FIG. 4B is the perspective view of the flame shown in FIG. 4A looking from the different angle.

As shown in FIG. 4A and FIG. 4B, at the back side in Z axis direction of the square ring shape flame 60, the magnet installation depression parts 66 are formed along the four sides of the square. At the magnet installation depression parts 66, as shown in FIG. 2 and FIG. 7, the magnet 80 is fixed via the magnetic board 61.

As shown in FIG. 7, the flame 60 is held to the base part 10 by the suspension wire 16 so that the space is formed between the rear plane of the magnet 80 and the front plane of the blur correction coil 30. The flame 60 is held in a movable manner along the driving plane which includes X axis and Y axis with respect to the base part 10.

At the flame 60, the lens holder 40 is held in a movable manner along Z axis direction via the front side spring 90 and the rear side spring 50 as shown in FIG. 2, therefore together with the flame 60, the lens holder 40 also moves along the driving plane which includes X axis and Y axis with respect to the base part 10.

By allowing the driving current to flow to the blur correction coil 30, due to the combined effect (VCM effect) of the coil 30 and the magnet 80, the force along the perpendicular direction with the optical axis acts on the magnet 80. Therefore, together with the lens holder 40, the flame 60 can move along the driving plane which includes X axis and Y axis, with respect to the base part 10. By moving the lens 100 with the lens holder 40 along the driving plane, the blur correction can be carried out.

Also, since the space is formed between the inner circumference plane of the magnet 80 and the outer circumference plane of the focusing coil 46, the lens holder 40 is held by the flame 60 via the springs 90 and 50 (see FIG. 2). By allowing the driving current to flow to the focusing coil 46, the combined effect (VCM effect) of the coil 30 and the magnet 80, the force along the optical axis direction acts on the coil 46. Therefore, the lens 100 with the lens holder 40 can move back and forth along the optical axis direction with respect to the flame 60. By moving the lens 100 with the lens holder 40 along the optical axis direction with respect to the flame 60, the autofocus (AF) can be carried out.

In the present embodiment, the magnet 80 functions both as the AF control magnet and the blur correction control magnet, thereby the number of the parts can be reduced, and hence AF control and blur correction control can be carried out by a simple constitution. Further, it can contribute to achieve a compact lens driving device.

Note that, the lens 100 may be constituted by plurality of the lens groups; however in order to make the explanation simple, the embodiment of using one lens will be used for describing the present embodiment.

Figure 6A:
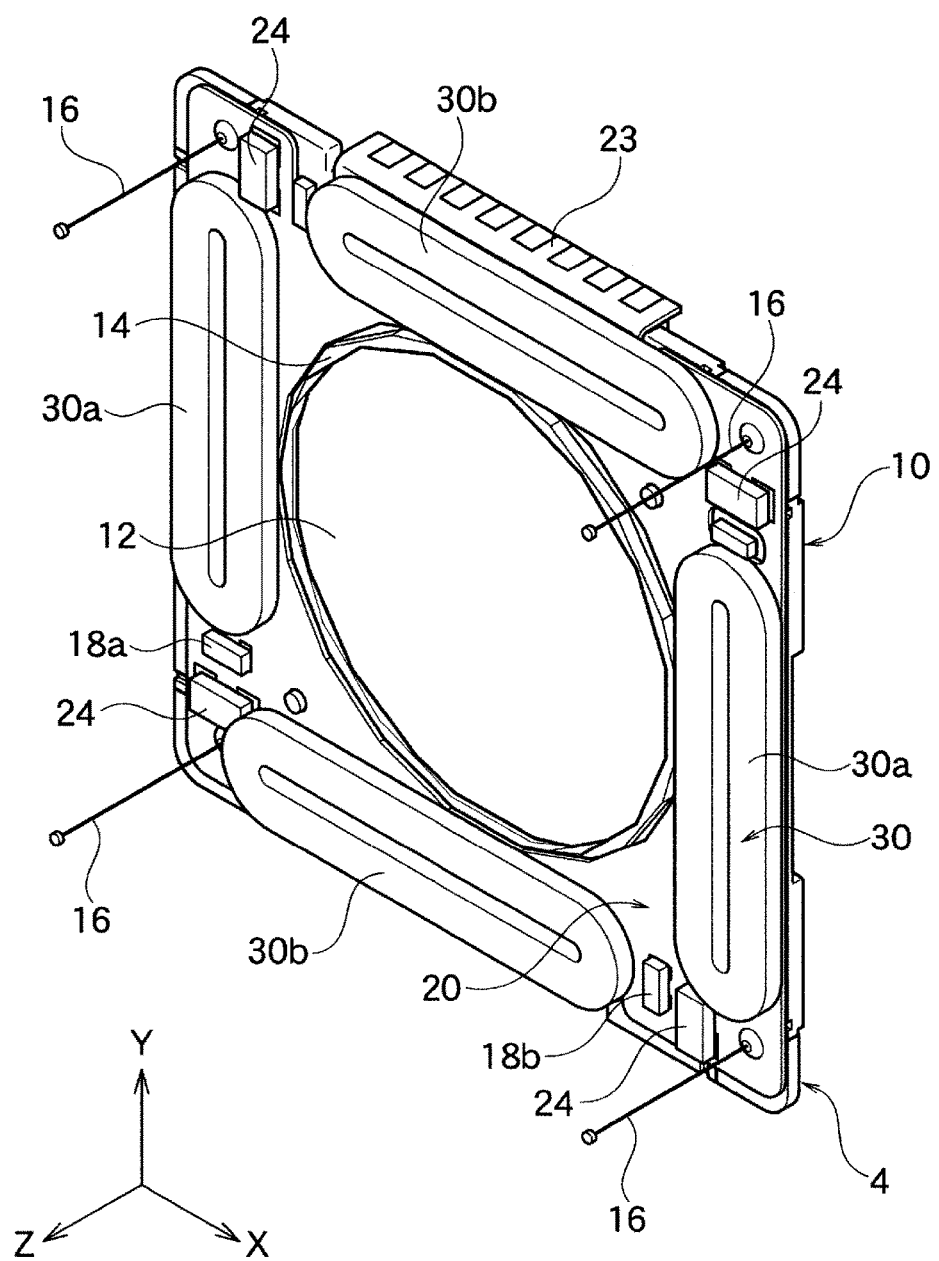
FIG. 6A is the perspective view of the partial assembly figure wherein the circuit substrate and the driving coil are placed on the base part shown in FIG. 5A.
Figure 6B:
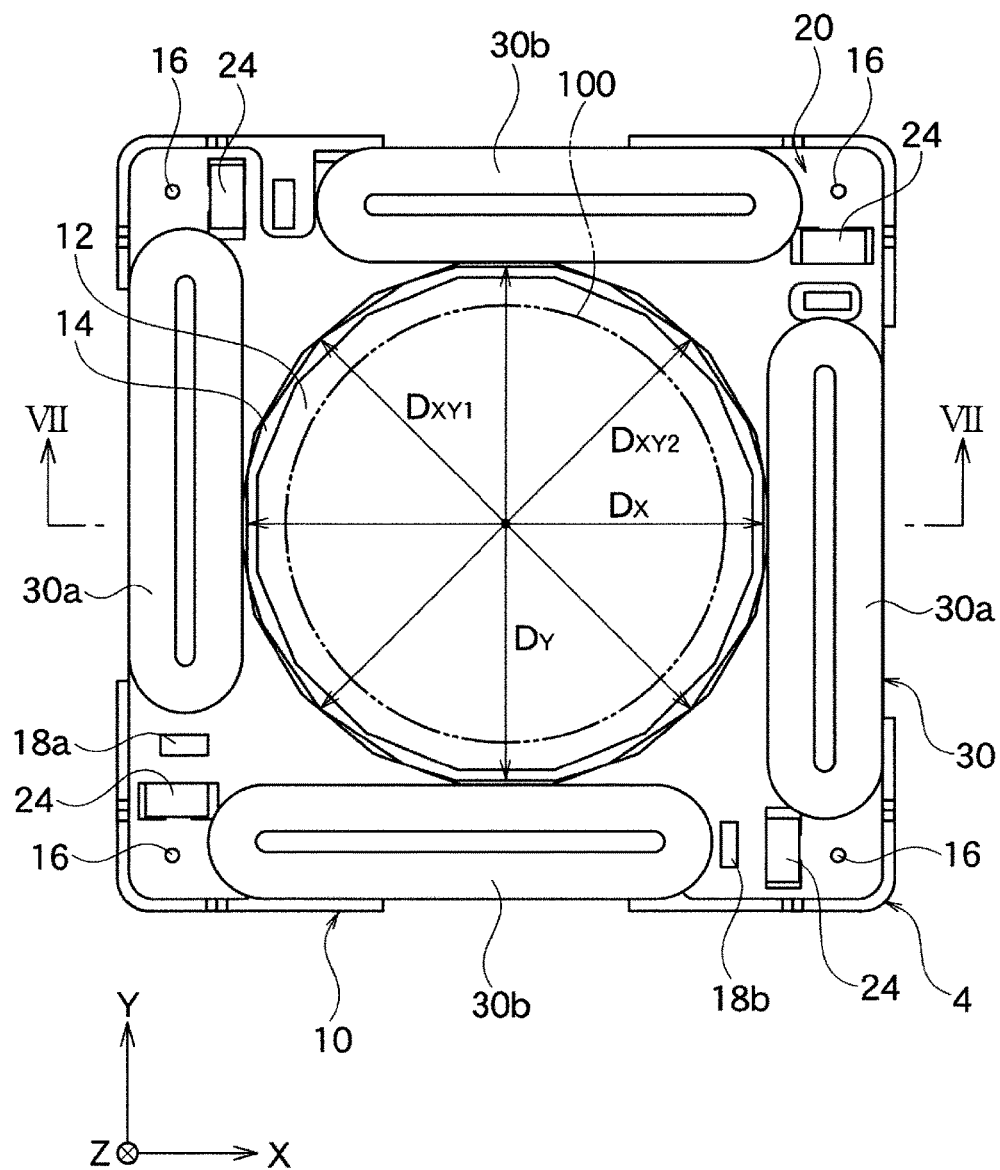
FIG. 6B is the enlarged top view of FIG. 5A, and it shows the relation between the lens and the opening part.

As shown in FIG. 6A and FIG. 6B, the blur correction coil 30 comprises a pair of first driving coils 30a and 30a which are opposing against each other by placing the opening part 12 in between along X axis direction, and a pair of the second driving coils 30b and 30b which are opposing against each other by placing the opening part 12 in between along Y axis direction. These driving coils 30a and 30b are placed, as a whole, on the front plane of the circuit substrate 20 of the square board shape, and are placed parallel along each sides of the circuit substrate 20 so as to surround the cylinder shape projection part 14.

The position of placement along Y axis direction of the first driving coils 30a and 30a opposing against each other along X axis directions is slightly off positioned; and the position of placement along X axis direction of the second driving coils 30b and 30b opposing against each other along Y axis directions is slightly off positioned as well. The driving coils 30a and 30b are slightly off positioned along the circumference direction as such because this allows the position sensors 18a and 18b and the dumper 24 to be mounted easily on the four corners of the circuit substrate 20, and also to easily form the through hole or so for the suspension wire 16.

The position sensor 18a is, for example, constituted by the hall sensor. The position sensor 18a and one of the first driving coils 30a together face against the rear plane of one of the first driving magnet 80a of the magnet 80 shown in FIG. 2, while taking predetermined space with the first driving magnet 80a; thereby the moving position along X axis direction of the first driving magnet 80a can be detected. Also, the position sensor 18b is, for example, constituted by the hall sensor. The position sensor 18b and one of the second driving coils 30b together face against the rear plane of one of the second driving magnet 80b of the magnet 80 shown in FIG. 2 while taking predetermined space with the second driving magnet 80b; thereby the moving position along Y axis direction of the first driving magnet 80b can be detected. These sensors 18a and 18b are electrically connected to the wire pattern of the circuit substrate 20.

In the present embodiment, the first driving coil 30a and the first driving magnet 80a are placed along Z axis while taking a predetermined space therebetween to constitute the first driving part (the first VCM) for the blur correction. The second driving coil 30b and the second driving magnet 80b are placed along Z axis while taking a predetermined space therebetween to constitute the second driving part (the second VCM) for the blur correction. The first driving axis of the first driving part is X axis, and the second driving axis of the second driving part is Y axis.

Figure 1C:
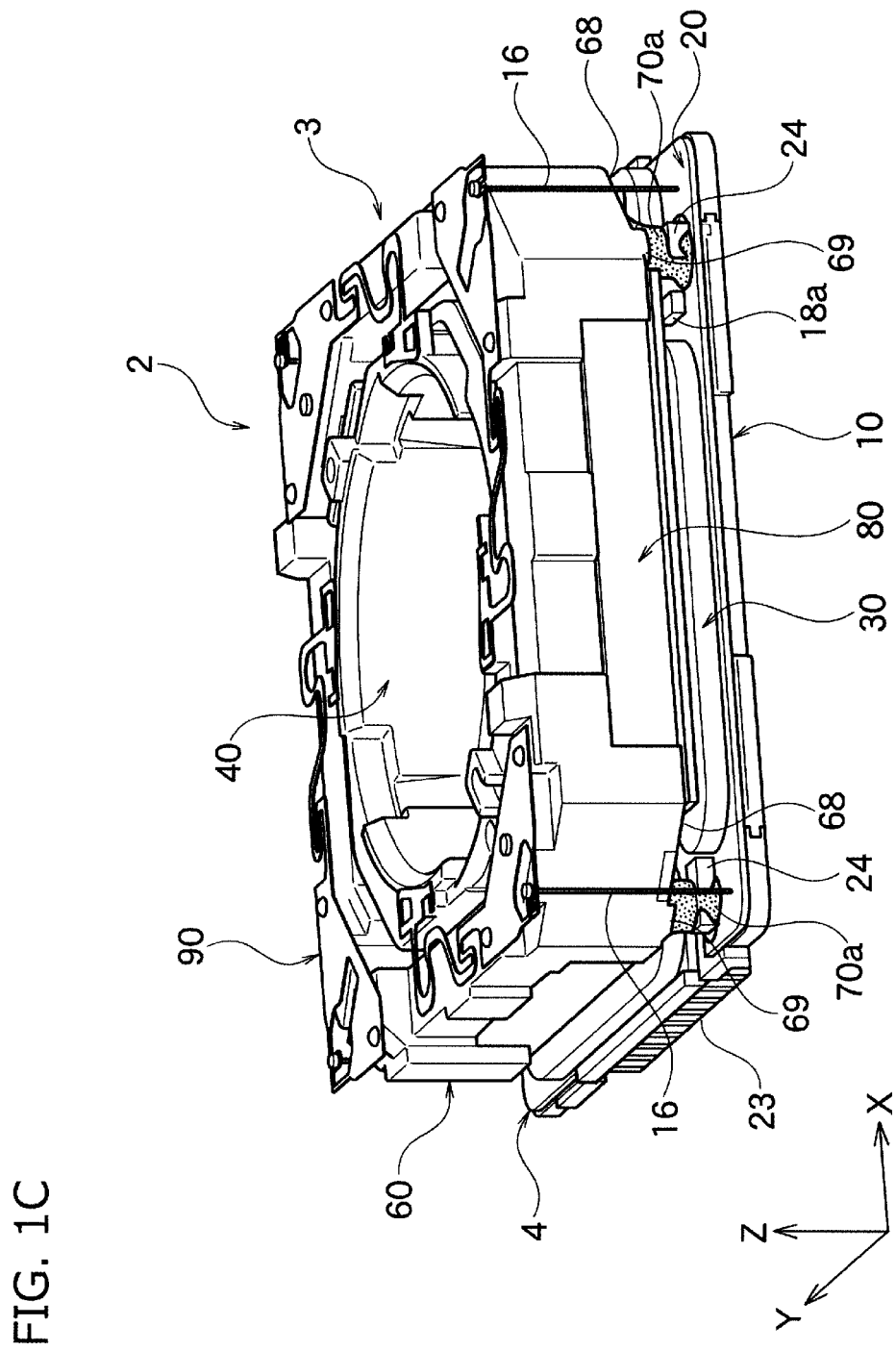
FIG. 1C is the perspective view of the entire lens driving device without the case as shown in FIG. 1B but looking from the different angle.
Figure 1D:
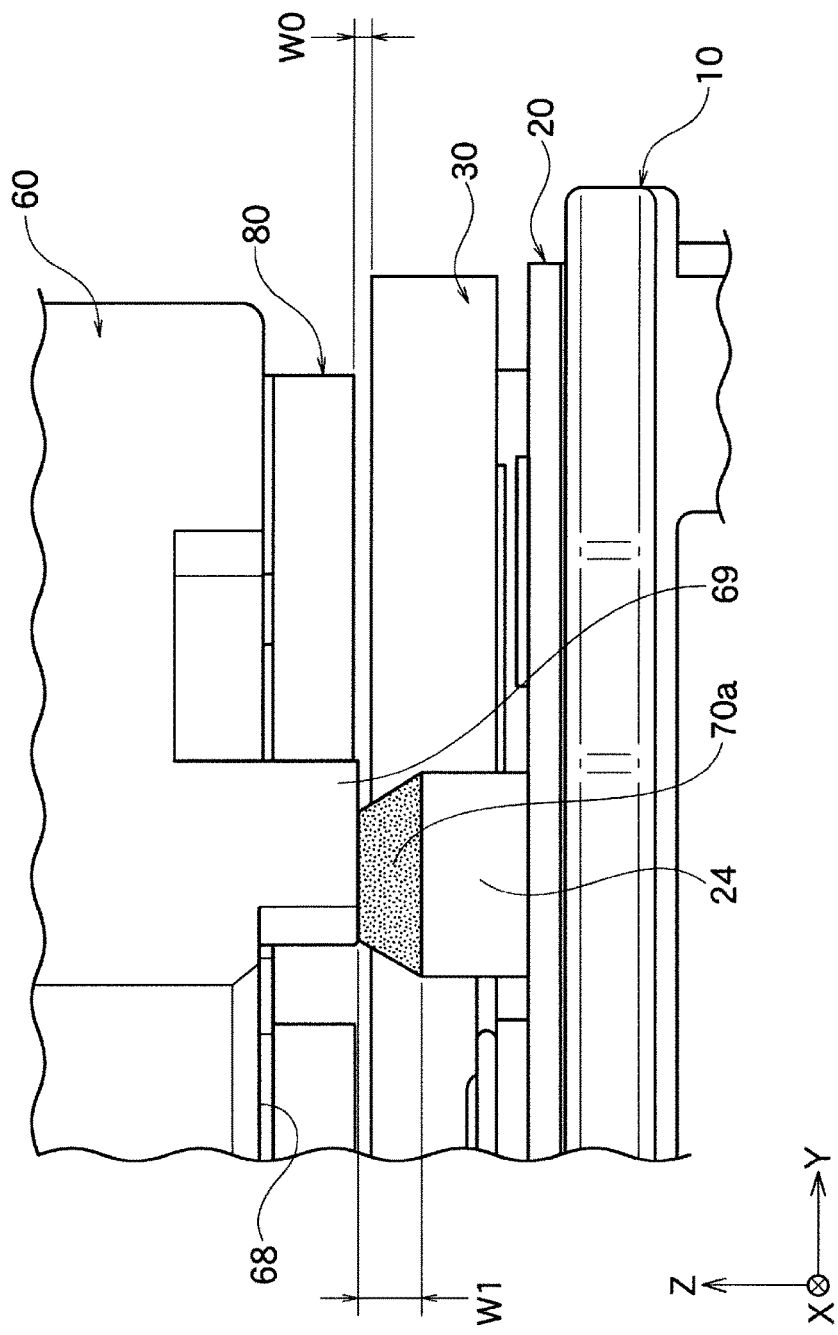
FIG. 1D is the partial enlarged schematic view showing the damper material filled between the damper table and the rear plane of the flame shown in FIG. 1C.

The damper tables 24 shown in FIG. 6A and FIG. 6B are respectively fixed to four corners of the circuit substrate 20 by means of the adhesive agent or by reflow or so. As shown in FIG. 1C and FIG. 1D, between the front plane of the damper table 24 and the corner part rear plane 68 or the rear plane projection part 69 of the flame 60, the space having the space width W1 is formed; and the first damper material 70a of gel form is present in this space so as to adhere to the both. The space width W1 is made wider than the space width W0 which is the space between the magnet 80 and the blur correction coil 30, and specifically the space width W1 is preferably 0.1 to 0.4 mm or so.

The first damper material 70a is for example constituted by a vibration absorbing material such as a soft gel material or a soft adhesive agent or so. The first damper material 70a functions as the damper when the flame 60 moves long the driving plane which includes X axis and Y axis with respect to the base 10 and the circuit substrate 20, and thus the suppression of the vibration can be expected.

In the present embodiment, the first damper material 70a is not placed between the magnet 80 and the coil 30, but it is placed between the damper table 24 and the corner part rear plane 68 of the flame 60, or between the damper table 24 and rear plane projection part 69 of the flame 60. Furthermore, the space width W1 is wider than the space width W0. Therefore, in the present embodiment, even if the impact is applied such as dropping the portable devices or so including the lens driving device 2, the magnet 80 and the coil 30 will collide thereby the stopper function comes into effect. Therefore, the first damper material 70a can be held between the damper table 24 and the corner part rear plane 68 of the flame 60, or between the damper table 24 and rear plane projection part 69 of the flame 60; hence the damper characteristic can be maintained in good condition even after the impact.

Figure 4C:
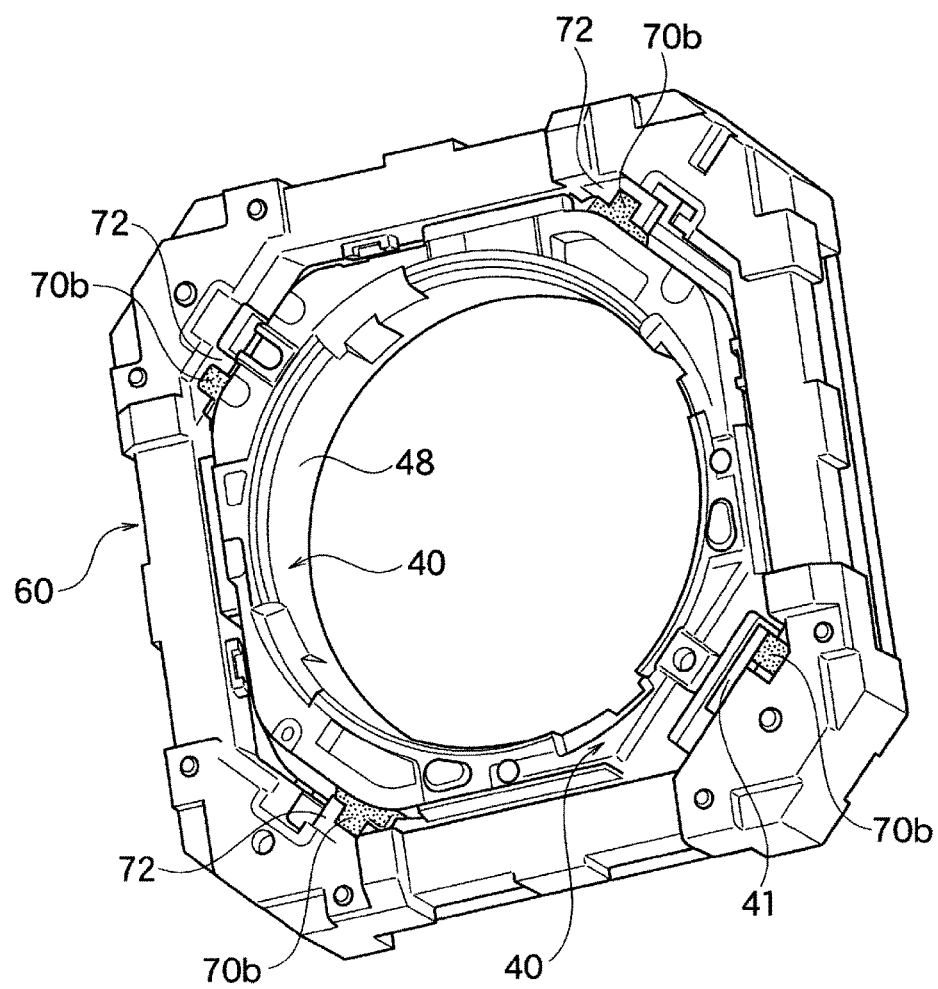
FIG. 4C is the perspective view wherein the flame and the lens holder shown in FIG. 2 are joined.
Figure 4D:
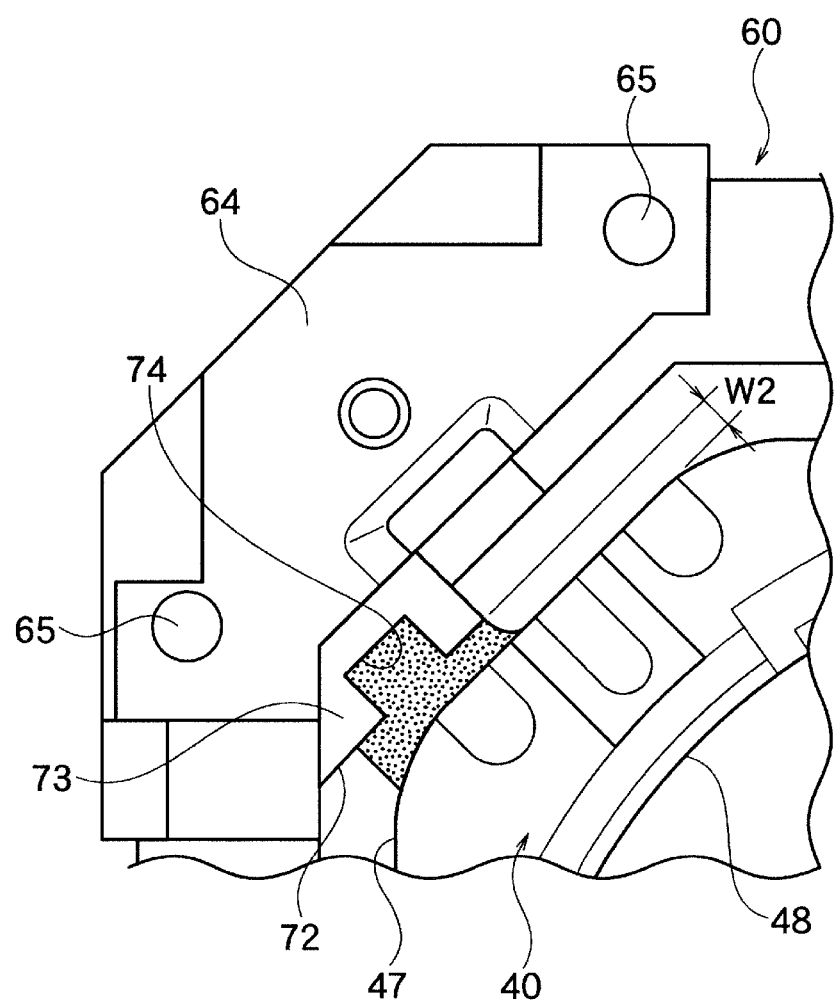
FIG. 4D is the partial enlarged figure of the essential part of the flame and the lens holder shown in FIG. 4C.

Also, in the present embodiment, as shown in FIG. 4A to FIG. 4E, at inner side of each four corner of the flame 60, the inner side projection parts 72 are formed which project towards the inside. As shown in FIG. 4D, the width W2 between the inner side projection part 72 and the outer circumference plane 47 of the lens holder 40 is preferably 0.1 to 0.3 mm or so. At the space of this width W2, the second damper material 70b is filled; and in this space, the second damper material 70b adheres to the inner side projection part 72 and to the outer circumference plane 47 of the lens holder 40. The second damper material 70b is constituted by similar material as the first damper material 70, but it does not have to be exactly the same.

Figure 4E:
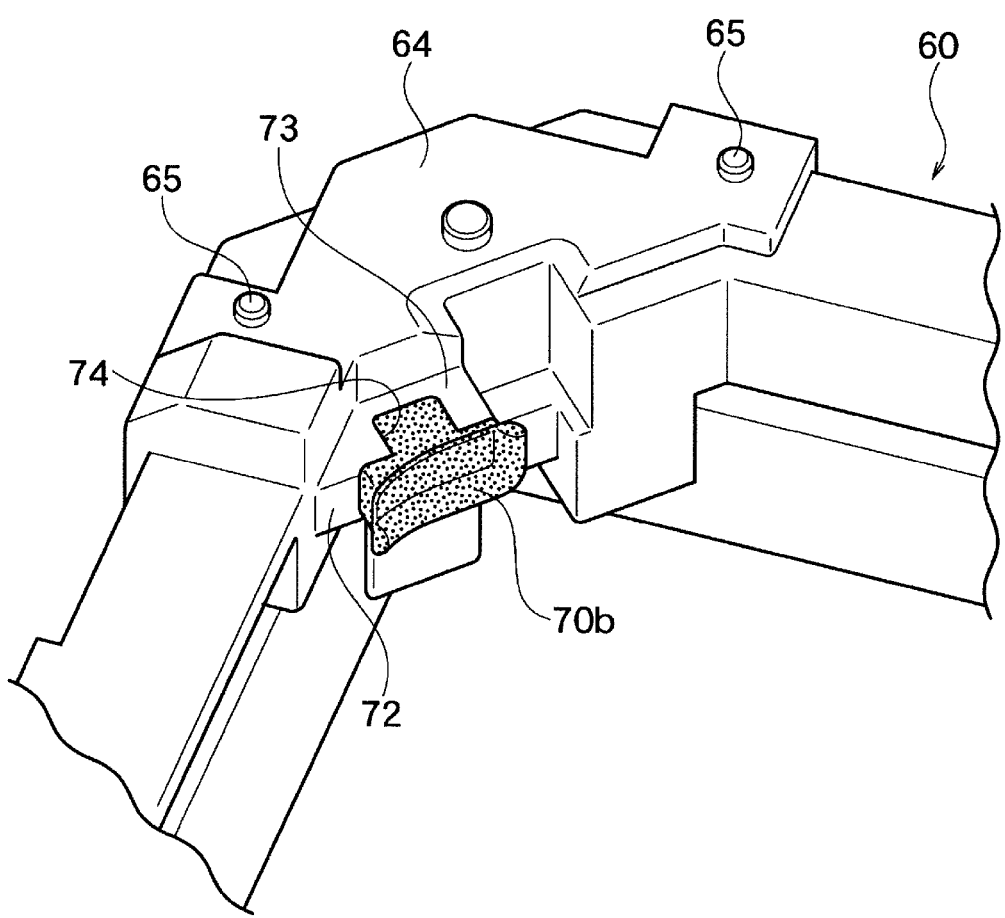
FIG. 4E is the partial enlarged figure of the essential part of only the flame shown in FIG. 4C.
Figure 4F:
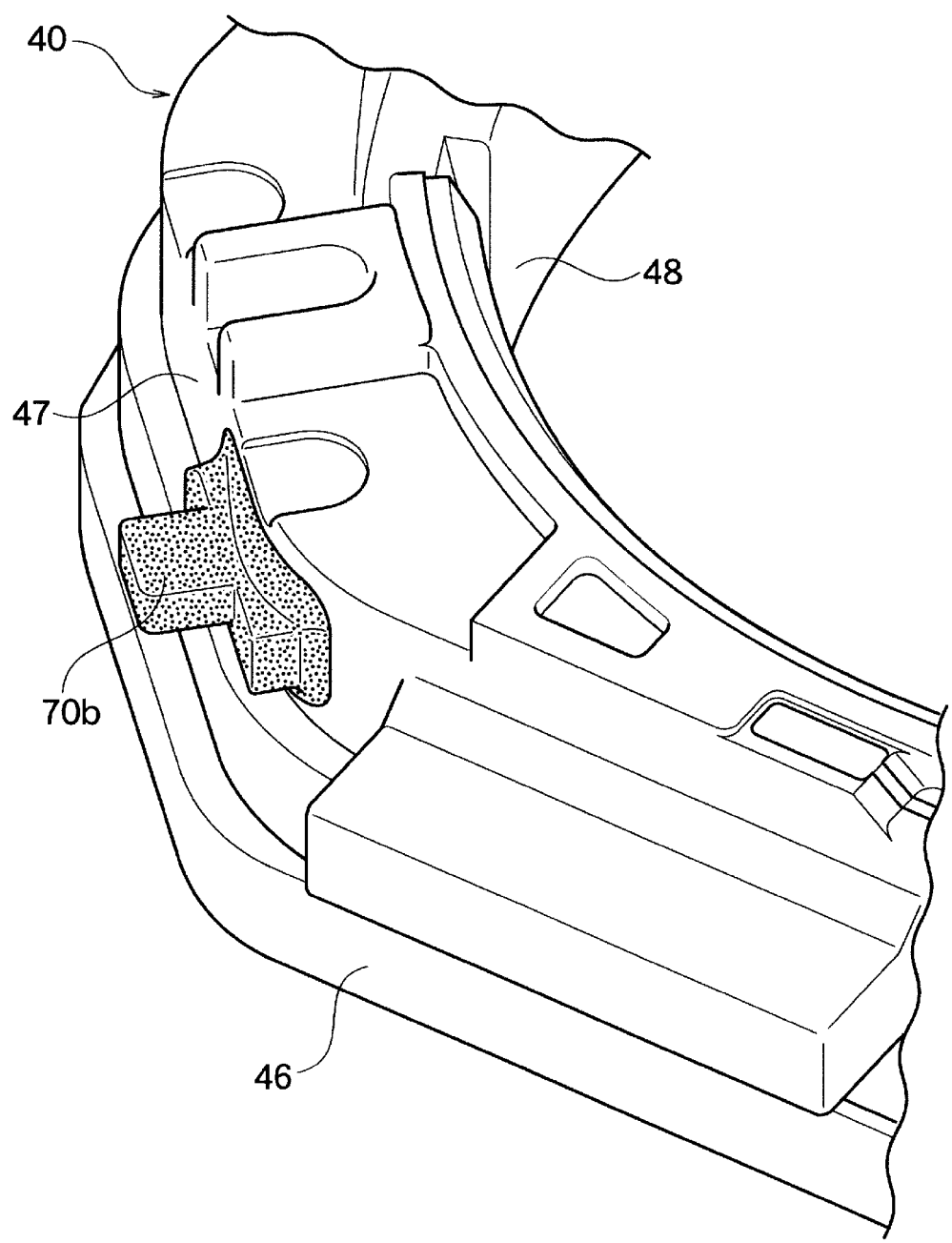
FIG. 4F is the partial enlarged figure of the essential part of only the lens holder shown in FIG. 4C.

As shown in FIG. 4E, at the front plane 73 of the inner side projection part 72, the damper depression part 74 is formed. The second damper material 70b is filled in this damper depression part 74 and in the space. The second damper material 70b in the space and the second damper material 70b filled in this damper depression part 74 are continuous. The second damper material 70b in the damper depression part 74 functions as the gel reservoir which can provide the damper material to the space, thus even if the impact is applied to the lens driving device 2, the risk of the second damper material 70b slipping out of the space is low.

The second damper material 70b functions as the damper when the lens holder 40 is focus driving along the optical axis direction (Z axis direction) with respect to the flame 60, thereby the suppression of the vibration can be expected. In the present embodiment, by providing the second damper material 70b near by the four corner parts of the flame 60 of the square shape, the damper materials 70b at the four positions can be placed at the position furthest from the center axis of the lens, thus the function as the damper can be fully exhibited. Note that, as shown in FIG. 4C, one of the damper materials 70b at the four positions may be provided at the space between the sensor part 41 installed at the part of the lens holder 40, and the inner circumference plane of the flame 60.

In the present embodiment, as shown in FIG. 6B, at the base part 10B, the opening part 12 is formed wherein a part of the lens 100 is to be inserted in a movable manner along the driving plane which includes the first driving axis (X axis) and the second driving axis (Y axis). In the present embodiment, the oblique inner diameter Dxy1 and Dxy2 of the opening part 12 along the oblique direction positioned at the middle of the first driving axis (X axis) and the second driving axis (Y axis), is larger than the first inner diameter Dx along X axis direction of the opening part 12, and also larger than the second inner diameter Dy along Y axis direction of the opening part 12.

In the present embodiment, the first inner diameter Dx and the second inner diameter Dy are roughly the same. Also, the oblique inner diameter Dxy1 and Dxy2 are roughly the same with respect to each other. The oblique inner diameter Dxy1 and Dxy2 have the maximum length at near the bisector of the crossing angle between the straight line along the first inner diameter Dx and the straight line along the second inner diameter Dy; and as getting closer to the straight line along the first inner diameter Dx or the second inner diameter Dy, preferably the oblique inner diameter Dxy1 and Dxy2 approach the first inner diameter Dx and the second inner diameter Dy. Note that, the position of the oblique inner diameter Dxy1 and Dxy2 are not particularly limited, and at any position in the middle of the first driving axis (X axis) and the second driving axis (Y axis), these only need to be larger than the first inner diameter Dx and the second inner diameter Dy.

In the present embodiment, the opening part 12 has n-polygonal shape; and the maximum value of the oblique inner diameter Dxy1 and Dxy2 are within 45 degrees (½ of the crossing angle of X axis and Y axis)±(360/n) with respect to X axis and Y axis. Note that, the shape of the inner circumference plane of the opening part 12 is not limited to polygonal shape, and it may be a curved shape. In such case, the maximum value of the oblique inner diameter Dxy1 and Dxy2 are within 45 degrees (½ of the crossing angle of X axis and Y axis)±15 degrees with respect to X axis and Y axis.

The inner diameter of the opening part 12 continuously changes or changes in a stepwise manner from the position where the oblique inner diameter Dxy1 and Dxy2 take the maximum value, to the first inner diameter Dx or the second inner diameter Dy. Note that, it may simply decrease from the maximum value of the oblique inner diameter Dxy1 and Dxy2 towards the first inner diameter Dx or the second inner diameter Dy; or it may approach towards the first inner diameter Dx or the second inner diameter Dy while repeating increase and decrease. The maximum value of the oblique inner diameter Dxy1 and Dxy2 are preferably 1.02 to 1.05 times of the first inner diameter Dx or the second inner diameter Dy.

In the lens driving device 2 according to the present embodiment, as shown in FIG. 6B, the oblique inner diameters Dxy1 and Dxy2 of the opening part 12 along the oblique direction positioned at the middle of X axis and Y axis is larger than the first inner diameter Dx along X axis direction of the opening part 12, and also larger than the second inner diameter Dy along Y axis direction of the opening part 12. By taking such constitution, not only in case of moving the lens 100 along X axis direction or Y axis direction, but also in case of moving along the oblique direction in middle thereof, there is no risk of the lens 100 to collide against the inner circumference plane of the cylinder shape projection part 14 constituting the periphery of the opening part 12.

That is, the maximum moving amount of the lens 100 along the oblique direction is the smaller value of the values obtained by dividing the maximum moving amount along the first and second driving axis direction with cosine of interior angle (0 to 90°) formed between the driving axis thereof and the oblique direction; and the maximum moving amount of the lens 100 along the oblique direction is larger than the maximum moving amount along the first and the second driving axis direction. However, by making the oblique inner diameter Dxy1 and Dxy2 larger than the first inner diameter Dx and the second inner diameter Dy, the space between the circular shape lens 100 and the periphery of the opening part becomes larger along the oblique direction, hence the lens 100 is prevented from colliding into the periphery of the opening part 12.

Further, for the lens driving device 2 according to the present embodiment, the opening part 12 formed at the base part 10 is not a perfect circle, and has an atypical shape wherein the inner diameter Dxy1 and Dxy2 along the oblique direction positioned between X axis direction and Y axis direction is larger than the inner diameter in X axis direction or Y axis direction. Therefore, compared to the opening part having the perfect circle shape which was determined based on the maximum moving amount towards the oblique direction, the size of the base part 10 can be made small, thus this contributes to make the device compact. Particularly, as shown in FIG. 6B, along the oblique direction which crosses with X axis and Y axis, there is still a space left, hence even if the inner diameter of the opening part 12 is enlarged in such direction, there is no need to enlarge the size of the base part 10 and the circuit substrate 20.

Also, if the size of the base part 10 and the circuit substrate 20 is the same, compared to the opening part having the perfect circle shape which was determined based on the maximum moving amount towards the oblique direction, in the present embodiment, the base part 10 can be enlarged but excluding the opening part 12 along X axis and Y axis. Therefore, the number of windings of the first driving coils 30*a* and the second driving coils 30*b* can be increased, hence the driving force is enhanced, and the accuracy of the blur correction is improved.

Further, in the present invention, the first driving part includes a pair of the first driving coils 30*a* positioned along X axis direction while placing the opening part 12 therebetween; and a pair of the first driving coils 30*a* are placed parallel along opposing two sides of the base 10. By taking such constitution, the driving force along X axis direction is enhanced and the accuracy of the blur correction improves.

Also, the second driving part includes a pair of the second driving coils 30*b* positioned along Y axis direction while placing the opening part 12 therebetween; and a pair of the second driving coils 30*b* are placed parallel along opposing two sides of the base 10. By taking such constitution, the driving force along Y axis direction is enhanced and the accuracy of the blur correction improves.

Further, as shown in FIG. 4A, the flame 60 has a square ring shape as a whole; and as shown in FIG. 1, the flame 60 is placed inside of the case 11 having the square cylinder shape which is fixed to the base 10, and the oblique direction roughly matches the direction of the diagonal line of the square ring shape. By taking such constitution, as shown in FIG. 6B, the first driving coils 30*a* and the second driving coils 30*b* can be placed efficiently on the base part 10 excluding the opening part 12, hence the size of the base part 10 can be made small, and therefore the device 2 can be compact.

Further, in the present embodiment, as shown in FIG. 6B, the cylinder shape projection part 14 is formed at the base part 10 along the periphery of the opening part 12; and the first driving coils 30*a* and the second driving coils 30*b* are placed around the cylinder shape projection part 14. By taking such constitution, the first driving coils 30*a* and the second driving coils 30*b* placed around the cylinder shape projection part 14 can be effectively prevented from colliding against the lens 100.

Also, by having the cylinder shape projection part 14, the dusts or so present on the surface of the base part 10 and the circuit substrate 20 becomes difficult to enter to the inside of the opening part 12. The lens 100 is inserted at the inside of the opening part 12, and the image sensor or so is placed at the rear position along the optical axis direction of the lens 100. If the dusts or so adheres to the image sensor, the quality of the images to be taken may decline, thus the dusts or so preferably does not enter inside the opening part 12.

Further, as shown in FIG. 5A to FIG. 5C, by having the cylinder shape projection part 14, the wires 32*a* which connects a pair of the first driving coils 30*a*, and the wires 32*b* which connects a pair of the second driving coils 30*b* can be easily placed along the outer circumference plane of the cylinder shape projection part 14. Also, by efficiently using the corner space between the cylinder shape projection part 14 and each driving coils 30*a* and 30*b*, the lead wires 34*a* and 34*b* of the driving coils 30*a* and 30*b* respectively can be easily connected to the circuit pattern of the circuit substrate 20.

Second Embodiment

The lens driving device 2 according to the second embodiment of the present invention comprises the same constitution and exhibits the same effect as the lens driving device 2 of the first embodiment, except for shown in below. Hereinafter, the parts which differ from the first embodiment will be mainly discussed, although some parts may overlap.

In the present embodiment, the opening part 12 shown in FIG. 6B may be a general opening part, and the oblique inner diameter Dxy1 and Dxy2 does not necessarily have to be larger than the first inner diameter Dx along X axis direction of the opening part 12, and also these do not necessarily have to be larger than the first inner diameter Dy along Y axis direction of the opening part 12. Also, in the present embodiment, a part of the lens 100 shown in FIG. 7 does not necessarily have to be in the opening part 12.

Figure 8:
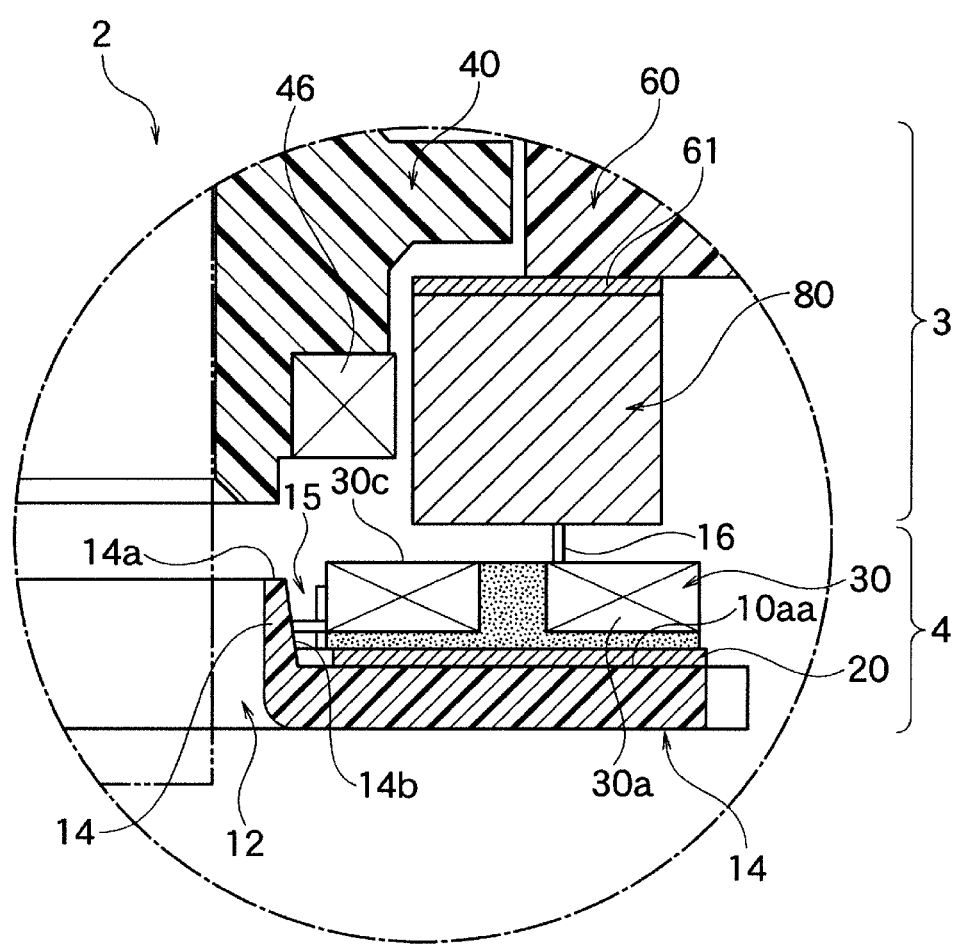
FIG. 8 is the enlarged cross section view wherein part of FIG. 7 is enlarged.

In the present embodiment, as shown in FIG. 6B, at the base part 10, the cylinder shape projection part 14 is formed along the periphery of the base opening part 12, similar to the aforementioned embodiment. As shown in FIG. 8 which is the enlarged view of FIG. 7, the coil mounting plane 10*aa* is provided at the outer circumference side of the cylinder shape projection part 14 wherein the coil mounting plane 10*aa* is the plane where the blur correction coil 30 is provided. The coil mounting plane 10*aa* is formed on the plane of the base part 10 facing the front side; and the first driving coils 30*a* and the second driving coils 30*b* are provided at the coil mounting plane 10*aa* via the circuit substrate 20.

The cylinder shape projection part 14 projects out towards the front side from the coil mounting plane 10*aa*; and the projection end 14*a* which is the end part in the front side of the cylinder shape projection part 14 is positioned at further front than the coil mounting plane 10*aa* of the base part 10. Also, the coil front end 30*c* which is the end part in the front side of the blur correction coil 30 (the first driving coil 30*a* in FIG. 8) placed on the coil mounting plane 10*aa* is positioned at further front than the projection end of the cylinder shape projection part 14.

The lens driving device 2 comprising such cylinder shape projection part 14 can stop the particles by the cylinder shape projection part 14 even in case the particles are generated in the lens driving device 2. Therefore, the lens driving device 2 can prevent the particles generated in the lens driving device 2 from flowing into the image sensor side which is at the rear side via the base opening part 12. If the particles adhere on the light receiving plane of the image sensor, the quality of the images generated by the image sensor may be deteriorated; or in case the particles are conductive material, this may damage the image sensor, however such problems can be prevented by the cylinder shape projection part 14.

Also, since the projection end 14*a* of the cylinder shape projection part 14 is positioned further rear side than the coil front end 30*c* of the blur correction coil 30, even in case the movable part 3 and the fixing part 4 contacts against each other due to the impact from the outside, the coil front end 30*c* receives the impact by contacting with the magnet 80, thereby the cylinder shape projection part 14 can be prevented from directly contacting with the movable part 3. Therefore, even if the movable part 3 and the fixing part 4 collides against each other due to the impact from the outside, the lens driving device 2 can prevent the particles generated by the impact from flowing into the image sensor side via the base opening part 12, because the position of the collision is at further outer circumference side than the cylinder shape projection part 14.

Furthermore, in the lens driving device 2, as shown in FIG. 8, a space 15 with a predetermined width is formed between the outer circumference side plane 14b of the cylinder shape projection part 14 and the blur correction coil 30. By having such space 15, even if the particles moves along the coil front end 30c of the blur correction coil 30 towards the base opening part 12, these particles will be trapped in the space 15. Therefore, the lens driving device 2 formed with such space 15 can effectively prevent the flowing of the particles into the base opening part 12. Note that, as shown in FIG. 7, if the diameter of the lens 100 is made large, the opening area of the base opening part 12 also becomes large, hence the particles tends to easily flow into the image sensor side, however the lens driving device 2 can prevent such particles from flowing in, hence it is particularly suitable as the lens driving device holding the lens 100 with large diameter.

As shown in FIG. 6B, in the lens driving device 2, the total area of the coil front end 30c which is the sum of four blur correction coils 30 is made larger than the area of the projection end 14a in order to secure the driving force for the blur correction. The lens driving device 2 is structured to receive the impact of the collision between the movable part 3 and the fixing part 4 by the coil front end 30c having larger area than the projection end 14a, hence the particles are prevented from being generated because a strong external force acts to a narrow range. Also, the damper material 70a shown in FIG. 1C functions as the buffer material to reduce the impact generated during the collision between the movable part 3 and the fixing part 4, thereby suppress the particles from being generated in the lens driving device 2.

Furthermore, as shown in FIG. 5A to FIG. 5C, in the lens driving device 2, the wire 32a as the wire part for connecting a pair of the first driving coils 30a, and the wire 32b as the wire part for connecting a pair of the second driving coils 30b are placed in the space 15 formed between the outer circumference side plane of the cylinder shape projection part 14 and the blur correction coil 30. By placing the wires 32a and 32b which connects to the blur connection coil 30 in the space 15, the wire distance of the blur correction coil 30 can be shortened, and also the space for placing other members in the base part 10 can be enlarged. Also, by efficiently using the corner space between the cylinder shape projection part 14 and each driving coils 30a and 30b, the lead wires 34a and 34b of the driving coils 30a and 30b respectively can be easily connected to the circuit pattern of the circuit substrate 20. Note that, in the figures, the wires 32a and 32b are omitted, except for FIG. 5A to FIG. 5C.

As shown in FIG. 5A, the outer circumference shape of the cylinder shape projection part 14 is polygonal shape as similar to the base opening part 12; and the outer circumference side plane 14b of the cylinder shape projection part 14 comprises the projection part flat plane parts 14ba which are the flat plane part extending in parallel to the flat plane including the optical axis. The projection part flat plane parts 14ba extending in parallel to the flat plane including the optical axis are formed at four places of the outer circumference side plane 14b of the cylinder shape projection part 14. Each of the projection part flat plane parts 14ba faces against each other by placing the space 15 in between with respect to the coil flat plane part 30d, which is part of the outer circumference side plane of the blur correction coil 30 and is the flat plane part extending in parallel to the flat plane including the optical axis.

Since such projection part flat plane parts 14ba are formed, the lens driving device 2 can easily place the wires 32a and 32b along the outer circumference side plane 14b of the cylinder shape projection part 14; and also the wires 32a and 32b can be prevented from slipping out from the space 15 due to the impact or so. Further, by forming the space 15 having certain width and predetermined length along X axis and Y axis directions, the particles can be easily trapped in the space 15; thereby the particles can be prevented more effectively from flowing into the case opening part 12.

Note that, the present invention is not limited to the aforementioned embodiments, and can be variously modified. For example, in the above mentioned embodiment, the driving force of the blur correction coil 30 is made larger by fixing each of the driving coils 30a and 30b to the surface of the circuit substrate 20; however in case there is no need to increase the driving force, the circuit substrate embedded with the coil may be used.

Also, in the above mentioned embodiment, the first driving axis and the second driving axis are placed in parallel to each side of square board shape base part 10 and the circuit substrate 20; however these may not be limited thereto. For example, the first driving coil 30a and the second driving coil 30b may be placed so that the first driving axis and the second driving axis are positioned on the diagonal line of the square board shape base part 10 and the circuit substrate 20.

Further, in the above mentioned embodiments, single magnet 80 functions as both the blur correction magnet and the autofocus magnet; however separate magnets may be prepared and installed.

Furthermore, in the above mentioned embodiments, the lens driving device 2 comprises two mechanism which are the autofocus mechanism and the blur correction mechanism; however the lens driving device of the present invention may have at least blur correction mechanism.

Also, in the above mentioned embodiment, the crossing angle between the first driving axis and the second driving axis was 90 degrees; however, for the present invention, these crossing angles may be other than 90 degrees. Also, these driving axes may cross in the angle other than perpendicular angles with respect to the optical axis.

In the above mentioned embodiments, four suspension wires 16 are used as the means to hold the flame 60 as the movable part moving freely along the driving plane (including X axis and Y axis) with respect to the base part 10 as the fixing part; however the number of the suspension wires is not limited to four, and plural numbers may be used.

NUMERICAL REFERENCES

2 . . . Lens driving device
3 . . . Movable part
4 . . . Fixing part
10 . . . Base part
11 . . . Case
12 . . . Base opening part
14 . . . Cylinder shape projection part
16 . . . Suspension wire
18a, 18b . . . Position sensor
20 . . . Circuit substrate
22 . . . Substrate opening part
23 . . . Connector part
24 . . . Damper table
30 . . . Blur correction coil 30a . . . First driving coil
30b . . . Second driving coil
30c . . . Coil front end
30d . . . Coil flat plane portion
40 . . . Lens holder
41 . . . Sensor part
42 . . . Front plane
43a to 43d . . . Installation projection parts
44a, 44b . . . Plate spring installation parts
45 . . . Rear plane
46 . . . Focus coil
47 . . . Outer circumference plane
48 . . . Inner circumference plane
49 . . . Step part
50 . . . Rear side spring
50a, 50b . . . Divisional plate springs
52a, 52b . . . Flame installation parts
54a, 54b . . . Holder installation parts
55a, 55b . . . Meandering parts
60 . . . Flame
61 . . . Magnetic board
62 . . . Notch part
64 . . . Front plane
65 . . . Installation projection part
66 . . . Magnet installation depression part
68 . . . Corner part rear plane
69 . . . Rear plane projection part
70a . . . First damper material
70b . . . Second damper material
72 . . . Inner side projection part
73 . . . Front plane
74 . . . Damper depression part
80 . . . Magnet
80a . . . First driving magnet
80b . . . Second driving magnet
90 . . . Front side spring
90a to 90d . . . Divisional plate spring
92a to 92d . . . Wire installation parts
93a to 93d . . . Holder installation parts
94a to 94d . . . Flame installation parts
95a to 95d . . . Meandering parts
100 . . . Lens

The invention claimed is:

1. A lens driving device comprising a first driving part allowing a lens part including at least one lens to relatively move against a base part along a first driving axis crossing with an optical axis of said lens, and
second driving part allowing said lens part to relatively move against said base along a second driving axis crossing with said optical axis of the lens and with said first driving axis, wherein
an opening part is formed at said base part to which a part of said lens is inserted in a movable manner along a driving plane including said first driving axis and said second driving axis, and
said opening part has an atypical shape in which a peripheral plane of said lens does not collide with an inner side plane of said opening part.

2. The lens driving device as set forth in claim 1, wherein
an opening width of said opening part along an oblique direction positioned in the middle of said first driving axis and said second driving axis is wider than an opening width of said opening part along a direction of said first driving axis, and also wider than an opening width of said opening part along a direction of said second driving axis.

3. The lens driving device as set forth in claim 1, wherein
said lens is installed in an inner side plane of a lens holder holding said lens.

4. The lens driving device as set forth in claim 1,
a circuit substrate is provided on said base plate,
said circuit substrate is formed as one body with said base part.

5. The lens driving device as set forth in claim 1, wherein
a projection part which projects out along the optical axis direction of said lens towards said movable part is formed along a peripheral of said opening part at said base part.

6. The lens driving device as set forth in claim 5, wherein
a driving coil which constitutes a part of the first driving part and the second driving part is, provided at said base part,
a coil front end of said driving coil is positioned at front side along said optical axis direction than said projection end of said projection part.

7. The lens driving device as set forth in claim 1, wherein
said driving coil is embedded with said circuit substrate.

8. The lens driving device as set forth in claim 1, wherein
only said lens is inserted to said opening part and said lens holder is not inserted to said opening part.

9. A lens driving device comprising
a first driving part allowing a lens part including at least one lens to relatively move against a base part along a first driving axis crossing with an optical axis of said lens, and
a second driving part allowing said lens part to relatively move against said base along a second driving axis crossing with said optical axis of the lens and with said first driving axis, wherein
an opening part is formed at said base part to which a part of said lens is inserted in a movable manner along a driving plane including said first driving axis and said second driving axis, and
said opening part is formed so that a peripheral plane of said lens held in a movable manner along said first driving axis, said second driving axis and said optical axis does not collide with an inner side of said opening part.

10. The lens driving device as set forth in claim 9, wherein
an opening width of said opening part along an oblique direction positioned in the middle of said first driving axis and said second driving axis is wider than an opening width of said opening part along a direction of said first driving axis, and also wider than an opening width of said opening part along a direction of said second driving axis.

11. The lens driving device as set forth in claim 9, wherein
said lens is installed in an inner side plane of a lens holder holding said lens.

12. Previously Presented) The lens driving device as set forth in claim 9, wherein
a circuit substrate is provided on said base plate,
said circuit substrate is formed as one body with said base part.

13. The lens driving device as set forth in claim 9, wherein
a projection part which projects out along the optical axis direction of said lens towards said movable part is formed along a peripheral of said opening part at said base part.

14. The lens driving device as set forth in claim 13, wherein
- a driving coil which constitutes a part of the first driving part and the second driving part is provided at said base part,
- a coil front end of said driving coil is positioned at front side along said optical axis direction than said projection end of said projection part.

15. The lens driving device as set forth in claim 9, wherein said driving coil is embedded with said circuit substrate.

16. The lens driving device as set forth in claim 9, wherein
- only said lens is inserted to said opening part and said lens holder is not inserted to said opening part.

17. A lens driving device comprising
- a first driving part allowing a lens part including at least one lens to relatively move against a base part along a first driving axis crossing with an optical axis of said lens, and
- a second driving part allowing said lens part to relatively move against said base along a second driving axis crossing with said optical axis of the lens and with said first driving axis, wherein
- an opening part is formed at said base part to which a part of said lens is ins in a movable manner along a driving plane including said first driving axis and said second driving axis, and
- said opening part is formed so that a peripheral plane of said lens does not collide with an inner side plane of said opening part.

* * * * *